(12) United States Patent
Tukka et al.

(10) Patent No.: US 11,100,935 B2
(45) Date of Patent: Aug. 24, 2021

(54) VOICE ASSISTANT DEVICE AND METHOD THEREOF

(71) Applicant: Samsung Electronics Co., Ltd., Suwon-si (KR)

(72) Inventors: Vijaya Kumar Tukka, Bangalore (IN); Chethan Konanakere Puttanna, Bangalore (IN); Deepraj Prabhakar Patkar, Bangalore (IN); Sulochan Naik, Bangalore (IN); Harish Bishnoi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/432,843

(22) Filed: Jun. 5, 2019

(65) Prior Publication Data

US 2019/0371343 A1     Dec. 5, 2019

(30) Foreign Application Priority Data

Jun. 5, 2018  (IN) .............................. 201841021011
Jan. 16, 2019  (IN) .............................. 201841021011
Jun. 4, 2019  (IN) .............................. 201942022136

(51) Int. Cl.
*G10L 15/22*  (2006.01)
*G10L 17/22*  (2013.01)

(52) U.S. Cl.
CPC .................................. *G10L 17/22* (2013.01)

(58) Field of Classification Search
CPC .......... G06F 15/22; G06F 15/26; G06F 1/367; G06F 1/325; G10L 17/22; G10L 15/22; G10L 15/26
See application file for complete search history.

(56) References Cited

U.S. PATENT DOCUMENTS

2005/0049859 A1*  3/2005  Arun ....................... G10L 15/22
                                                    704/231
2007/0225982 A1   9/2007  Washio
(Continued)

FOREIGN PATENT DOCUMENTS

JP       2006-071794 A      3/2006
JP       2006-251545 A      9/2006
(Continued)

OTHER PUBLICATIONS

ISA/KR, International Search Report, International Application No. PCT/KR2019/006823, dated Sep. 18, 2019, 3 pages.
(Continued)

Primary Examiner — Daniel Abebe

(57) ABSTRACT

Embodiments of present disclosure relates to a voice assistant device and method for controlling the voice assistant device. The voice assistant device comprising receiver configured to receive at least one voice input from user, when operated in wake-up mode. Intent associated with the at least one voice input from the at least one user. Further, probability of issuance of a subsequent voice input from the at least one user is determined based on at least one of the intent, historic data and one or more contextual factors. An extended wake-up duration of the voice assistant device is estimated, when the probability is greater than a predefined threshold value. Further, duration of the wake-up mode is extended for the extended wake-up duration to receive the subsequent voice input from the at least one user.

20 Claims, 16 Drawing Sheets

(56) References Cited

U.S. PATENT DOCUMENTS

| | | | |
|---|---|---|---|
| 2009/0222265 A1* | 9/2009 | Iwamiya | G10L 15/22 |
| | | | 704/246 |
| 2012/0034904 A1 | 2/2012 | LeBeau et al. | |
| 2013/0166305 A1* | 6/2013 | Spaulding | G10L 15/22 |
| | | | 704/275 |
| 2015/0081296 A1 | 3/2015 | Lee et al. | |
| 2016/0077794 A1 | 3/2016 | Kim et al. | |
| 2016/0232897 A1* | 8/2016 | Pereira | G06F 3/167 |
| 2016/0240194 A1* | 8/2016 | Lee | G06F 1/3293 |
| 2017/0169817 A1 | 6/2017 | VanBlon et al. | |
| 2018/0293974 A1* | 10/2018 | Georges | G10L 15/183 |
| 2019/0348065 A1* | 11/2019 | Talwar | G10L 15/22 |

FOREIGN PATENT DOCUMENTS

| | | |
|---|---|---|
| KR | 10-2015-0015703 A | 2/2015 |
| KR | 10-1851787 B1 | 4/2018 |
| WO | 2016127042 A1 | 8/2016 |

OTHER PUBLICATIONS

Supplementary European Search Report dated May 19, 2021 in connection with European Application No. 19815216.7, 6 pages.

* cited by examiner

VOICE ASSISTANT DEVICE AND METHOD THEREOF

CROSS-REFERENCE TO RELATED APPLICATIONS

This application is based on and claims priority under 35 U.S.C. § 119 to Indian Patent Provisional Application No. 201841021011 filed on Jun. 5, 2018, Indian Patent Application No. 201841021011 filed on Jan. 16, 2019, and Indian Patent Divisional Application No. 201942022136 filed on Jun. 4, 2019, in the Indian Intellectual Property Office, the disclosures of which are incorporated by reference herein in their entirety.

BACKGROUND

1. Field

The present subject matter is related in general to digital assistant systems, more particularly, but not exclusively apparatus and method for controlling the voice assistant device.

2. Description of Related Art

A voice assistant device is a digital assistant that uses voice recognition, speech synthesis, and Natural Language Processing (NLP) to provide a service through a particular application. The voice assistant device is triggered to switch from sleep mode to wake-up mode, using a trigger word associated with the voice assistant device. A user may provide request to the voice assistant device by initially saying the trigger word, followed by the request.

During conversation with the voice assistant device, it may be essential that the user keeps saying the trigger word over and over again, especially while having conversations with the voice assistant device, to keep the voice assistant device in the wake-up mode. By which, context of the conversation may be maintained by the voice assistant device and subsequent request may be easily interpreted by the voice assistant device for accurate response. In case, the user forgets to use the trigger word during the conversation, the voice assistant device may switch to the sleep-mode. In such cases, further requests from the user may be missed out by the voice assistant device. The trigger word may have to be said again to initiate new chain of conversation which would be new context to the voice assistant device.

Some of the voice assistant devices may be configured to operate in follow-up mode. In such voice assistant devices, during the wake-up mode and when a request is received from the user, the voice assistant device may be configured to provide a response and switch to the follow-up mode. In the follow-up mode, the voice assistant device is configured to stay in the wake-up mode for a predefined duration of time. The user is bound to provide further requests in span of the predefined duration of time. If no requests are received from the user during the follow-up mode, the voice assistant device may switch to the sleep mode. Usually, the predefined duration of time is static and may be for a very short period of time. In case, the user provides further requests after the predefined duration of time, then such requests may not be received by the voice assistant device. Also, with such static time period of the follow-up mode, the user may be burdened to be ready with further requests which is to be conveyed within the static time period. In some cases, the user may not be aware if the voice assistant device is operating in the follow-up mode, when providing the request. Also, the request may have to be conveyed well before end of the predefined duration of time.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

In an embodiment, the present disclosure relates a method of a voice assistant device. Initially, at least one voice input from at least one user is received during wake-up mode of the voice assistance device and intent associated with the at least one voice input is identified. Probability of issuance of a subsequent voice input from the at least one user is determined based on at least one of the intent, historic data and one or more contextual factors. When the probability is greater than a predefined threshold value, extended wake-up duration of the voice assistant device is estimated. Further, duration of the wake-up mode of the voice assistant device is extended for the extended wake-up duration to receive the subsequent voice input from the at least one user.

In an embodiment, the present disclosure relates to a voice assistant device comprising a receiver configured to receive at least one voice input from at least one user, when operated in wake-up mode. The voice assistant device further comprises a processor and a memory communicatively coupled to the processor. The memory stores processor-executable instructions, which, on execution, cause the processor to identify intent associated with the at least one voice input by the voice assistant device from the at least one user. Further, the processor is configured to determine probability of issuance of a subsequent voice input from the at least one user based on at least one of the intent, historic data and one or more contextual factors. An extended wake-up duration of the voice assistant device is estimated, when the probability is greater than a predefined threshold value. Further, duration of the wake-up mode is extended for the extended wake-up duration to receive the subsequent voice input from the at least one user.

In an embodiment, the present disclosure relates a method for controlling a voice assistant device. Initially, intent associated with at least one voice input received by the voice assistant device from at least one user, is identified. Probability of issuance of a subsequent voice input from the at least one user is determined based on at least one of the intent, historic data and one or more contextual factors. When the probability is greater than a predefined threshold value, extended wake-up duration of the voice assistant device is estimated. Further, duration of the wake-up mode of the voice assistant device is extended for the extended wake-up duration to receive the subsequent voice input from the at least one user.

In an embodiment, the present disclosure relates to a control apparatus for controlling a voice assistant device. The control apparatus is associated with the voice assistant device and comprises a first processor and a first memory communicatively coupled to the first processor. The first memory stores processor-executable instructions, which, on execution, cause the first processor to control the voice assistant device. Initially, intent associated with at least one voice input received by the voice assistant device from at least one user, is identified. Probability of issuance of a subsequent voice input from the at least one user is determined based on at least one of the intent, historic data and one or more contextual factors. When the probability is greater than a predefined threshold value, extended wake-up duration of the voice assistant device is estimated. Further, duration of the wake-up mode of the voice assistant device is extended for the extended wake-up duration to receive the subsequent voice input from the at least one user.

In an embodiment, the present disclosure relates to a method for determining probability of issuance of a subsequent voice input to a voice assistant device. Initially, for the determination, one or more keywords is extracted from plurality of words in at least one voice input received by the voice assistant device, based on intent of the voice input. Domain associated with the at least one voice input is identified based on the one or more keywords. Further, domain matching scores are computed for the identified domain with plurality of pre-stored domains associated with the at least one user. The probability of issuance of the subsequent voice input to the voice assistant device is determined based on the domain matching scores, historic data and one or more contextual factors associated with the at least one user.

In an embodiment, the present disclosure relates to a probability determine apparatus for determining probability of issuance of a subsequent voice input to a voice assistant device. The probability determine apparatus is associated with the voice assistant device and comprises a second processor and a second memory communicatively coupled to the second processor. The second memory stores processor-executable instructions, which, on execution, cause the second processor to determine the probability of issuance of the subsequent voice input to the voice assistant device. Initially, for the determination, one or more keywords is extracted from plurality of words in at least one voice input received by the voice assistant device, based on intent of the voice input. Domain associated with the at least one voice input is identified based on the one or more keywords. Further, domain matching scores are computed for the identified domain with plurality of pre-stored domains associated with the at least one user. The probability of issuance of the subsequent voice input to the voice assistant device is determined based on the domain matching scores, historic data and one or more contextual factors associated with the at least one user.

The foregoing summary is illustrative only and is not intended to be in any way limiting. In addition to the illustrative aspects, embodiments, and features described above, further aspects, embodiments, and features will become apparent by reference to the drawings and the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE ACCOMPANYING DRAWINGS

The accompanying drawings, which are incorporated in and constitute a part of this disclosure, illustrate various embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1A:
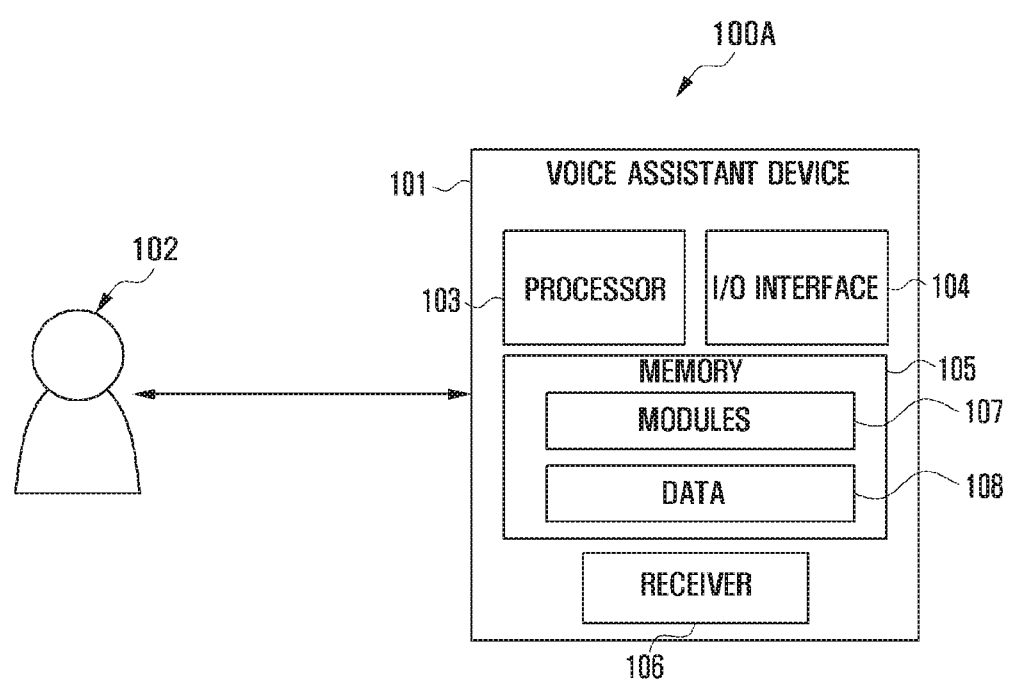
FIGS. 1A-1C show environments of a voice assistant device, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure proposes method and apparatus to control a voice assistant device, for providing best user experience. When a voice input is received from at least one user, the voice assistant device is configured to check on probability of issuance of subsequent voice input. If the probability is greater than a predefined threshold value, wake-up time of the voice assistant device is extended. The present disclosure also proposes to determine extended wake-up duration of the voice assistant device, based on the probability. The wake-up duration is dynamically determined based on context of the voice inputs, the probability and various other factors related to the at least one user.

FIG. 1A shows an environment of a voice assistant device 101. The voice assistant device 101 may be configured to perform voice recognition, speech synthesis, and Natural Language Processing (NLP) to provide a service to at least one user 102. The voice assistant device 101 may implement Artificial Intelligence (AI) to provide service to at least one user 102. The voice assistant device 101 may be associated with a trigger to initiate the service to the at least one user 102. When not in use, the voice assistant device 101 is configured to be operated in sleep-mode and when in use, the voice assistant device 101 is configured to be operated in wake-up mode. The voice assistant device 101 may switch from the sleep mode to the wake-up mode, when a trigger is provided to the voice assistant device 101. In an embodiment, the trigger may be a particular word associated with the voice assistant device 101. When the at least one user 102 says the trigger, the voice assistant device 101 is initiated to listen to request followed by the trigger. Usually, the request is said by the at least one user 102 to the voice assistant device 101. The request may be in form of voice input that is received by the voice assistant device 101. In an embodiment, the voice assistant device 101 may be dedicated hardware component, which is registered with an account of the at least one user 102. In an embodiment, the voice assistant device 101 may be embedded in user device of the at least one user 102. For example, the voice assistant device 101 may be embedded in smart phone, smart watch, tablet, laptops and so on of the at least one user 102. In an embodiment, the voice assistant device 101 may be embedded in an infotainment system of a vehicle of the at least one user 102. In an embodiment, the voice assistant device may be embedded in an apparatus and is configured to control the apparatus using voice commands. The apparatus may include, but is not limited to, refrigerator, fridge, TV, washing machine, music player, and so on. The voice assistant device 101 may be any device which receives voice inputs from the at least one user 102 and provides service based on the voice inputs. In an embodiment, the voice assistant device 101 may be connected with other devices or applications to provide service to the at least one user 102. For example, if the voice assistant device 101 is embedded in a vehicle, the voice assistant device 101 may be connected with music system, navigation system, lighting system and so on of the vehicle. In case, the at least one user 102 requests the voice assistant device 101 for navigating to a destination, the voice assistant device 101 may communicate with the navigation system, to provide service to the at least one user 102. Consider, the voice assistant device 101 is placed in a home environment. The voice assistant device 101 may be connected with home appliances in the home environment, to control operation of the home appliances. The home appliances may be controller based on requests from the at least one user 102. For example, if the at least one user 102 requests to switch ON AC. The voice assistant device 101 may communicate to control operation of the AC and switch the AC ON. With further request, the voice assistant device 101 may be configured to control temperature of the AC, as well.

In an embodiment, the voice assistant device 101 may be associated with one or more output means to provide response to the at least one user 102. In an embodiment, the one or more output means may include display unit, audio output unit, Light Emitting Diodes (LEDs) and so on. The response may be provided via visual display or audio outputs or may be indicated via the LEDs. One or more other means, known in the art, may be implemented in the voice assistant device 101, for providing response to the at least one user 102.

Further, the voice assistant device 101 may include a processor 103, I/O interface 104, a memory 105 and a receiver 106. In some embodiments, the memory 105 may be communicatively coupled to the processor 103. The memory 105 stores instructions, executable by the processor 103, which on execution, may cause the voice assistant device 101 to provide services to the at least one user 102. In an embodiment, the memory 105 may include one or more modules 107 and data 108. The one or more modules 107 may be configured to perform the steps of the present disclosure using the data 108, to provide the services to the at least one user 102. In an embodiment, each of the one or more modules 107 may be a hardware unit which may be outside the memory 105 and coupled with the voice assistant device 101. The voice assistant device 101 may be implemented in a variety of computing systems, such as a laptop computer, a desktop computer, a Personal Computer (PC), a notebook, a smartphone, a tablet, e-book readers, a server, a network server, and the like.

In an embodiment, the voice assistant device 101 may be controlled by a control apparatus 109. The control apparatus 109 may be configured to control operation of the voice assistant device 101 based on at least one voice input received from the at least one user 102. Further, the control apparatus 109 may be configured to identify intent associated with the at least one voice input from the at least one user 102. In an embodiment, the intent may convey context or meaning of the at least one voice input received from the at least one user 102. In an embodiment, the intent associated with the at least one voice input may be identified by performing Natural-Language Understanding (NLU) on the at least one voice input. In an embodiment, conversation knowledge of previous voice inputs of the voice assistant device 101 may be used to determine the intent of the received at least one voice input.

Further, the probability of issuance of a subsequent voice input from the at least one user 102 is determined for the at least one voice input. The probability may be determined based on at least one of the intent, historic data and one or more contextual factors is determined. The historic data may be associated with the at least one user 102. In an embodiment, the historic data may include past requests of the at least one user 102 and corresponding response provided by the voice assistant device 101. In an embodiment, the historic data may include time of request, day of request, location of request, and other data related to the past requests from the at least one user 102. In an embodiment, the one or more contextual factors may include at least one of user related factors, time related factors data and environment related factors. In an embodiment, the user related factors may include daily routines, location, preferences and so on, related to the at least one user 102. In an embodiment, time related data may include time of the request, day of the request, if the request is in morning, afternoon or evening and so on. In an embodiment, the environment related factors include connectivity details and status details of appliances or applications connected with the voice assistant device 101. One or more other factors, which may be used for determining the probability of issuance of the subsequent voice input may be included in the one or more contextual factors.

In an embodiment, the probability determination apparatus 110 associated with the control apparatus 109 and the voice assistant device 101 may be configured to determine the probability of issuance of the subsequent voice input. For determining the probability of issuance, the probability determination apparatus 110 may be configured to d extract one or more keywords from plurality of words in the at least one voice input. The one or more keywords may be extracted based on intent of the at least one voice input. In an embodiment, the one or more keywords may be extracted by assigning weightage to each of the plurality of words of the at least one voice input. Further, keywords from the plurality of words, with weightage greater than a predefined weightage value, may be identified to be the one or more keywords.

In an embodiment, the probability determination apparatus 110 may be configured to build a conversation knowledge for the at least one voice input, based on the one or more extracted keywords. In an embodiment, the conversion knowledge may be used for identifying the intent of subsequent voice inputs to the voice assistant device 101.

Upon extracting the one or more keywords, domain associated with the at least one voice input may be identified based on the one or more keywords. Further, domain matching scores are computed for the identified domain with plurality of pre-stored domains associated with the at least one user 102. The probability determination apparatus 110 determines the probability of issuance of the subsequent voice input to the voice assistant device 101, based on the domain matching scores, the one or more contextual factors and the historic data associated with the at least one user 102.

Upon determining the probability of issuance of the subsequent voice input, the control apparatus 109 may be configured to compare the probability with a predefined threshold value. In an embodiment, the predefined threshold value may be determined by analysing the historic data, through devices connected to the voice assistance device 101. When the determined probability is greater than the predefined threshold value, extended wake-up duration of the voice assistant device 101 may be determined. Further, the duration of the wake-up mode of the voice assistant device 101 may be extended for the extended wake-up duration, to receive the subsequent voice input from the at least one user 102. In an embodiment, the extended wake-up duration may be estimated to be directly proportional to the probability of issuance of the subsequent voice input. For example, if the determined probability is high, the extended wake-up duration may be determined to be for a longer duration. Similarly, when the determined probability is low but equal or greater than the predefined threshold value, the extended wake-up duration may be determined to be for a shorter duration.

In an embodiment, when the probability is determined to be lesser than the predefined threshold value. The control apparatus 109 may configure the voice assistant device 101 to be in the sleep mode, until a trigger to operate the voice assistant device 101 in the wake-up mode is detected.

Further, during the extended wake-up duration, if absence of the subsequent voice input is detected, the voice assistant device 101 may be configured to be in the sleep-mode.

Figure 1B:
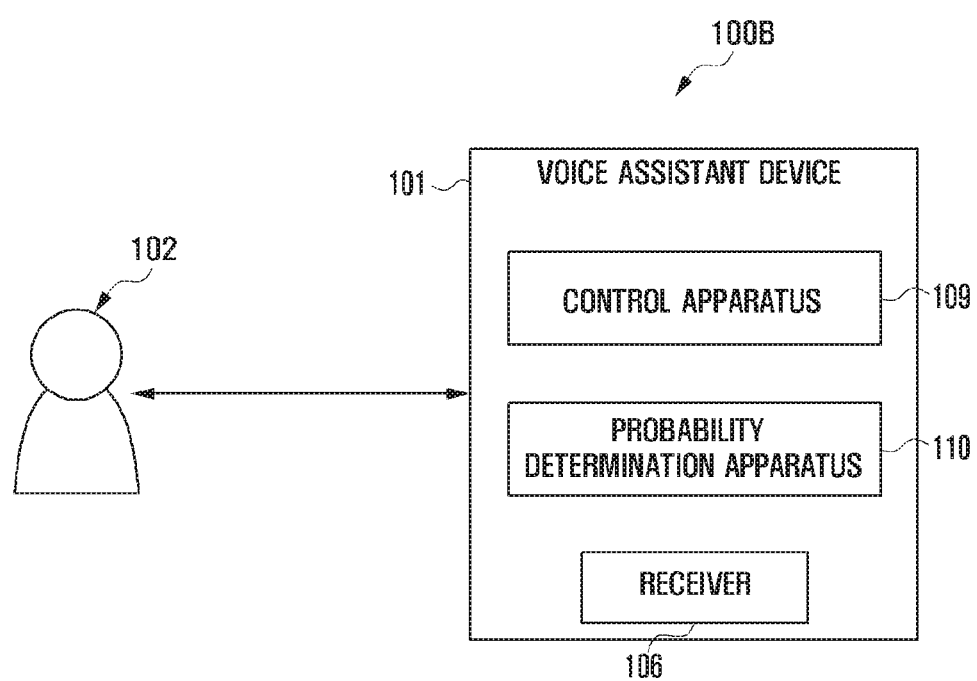
Figure 1C:
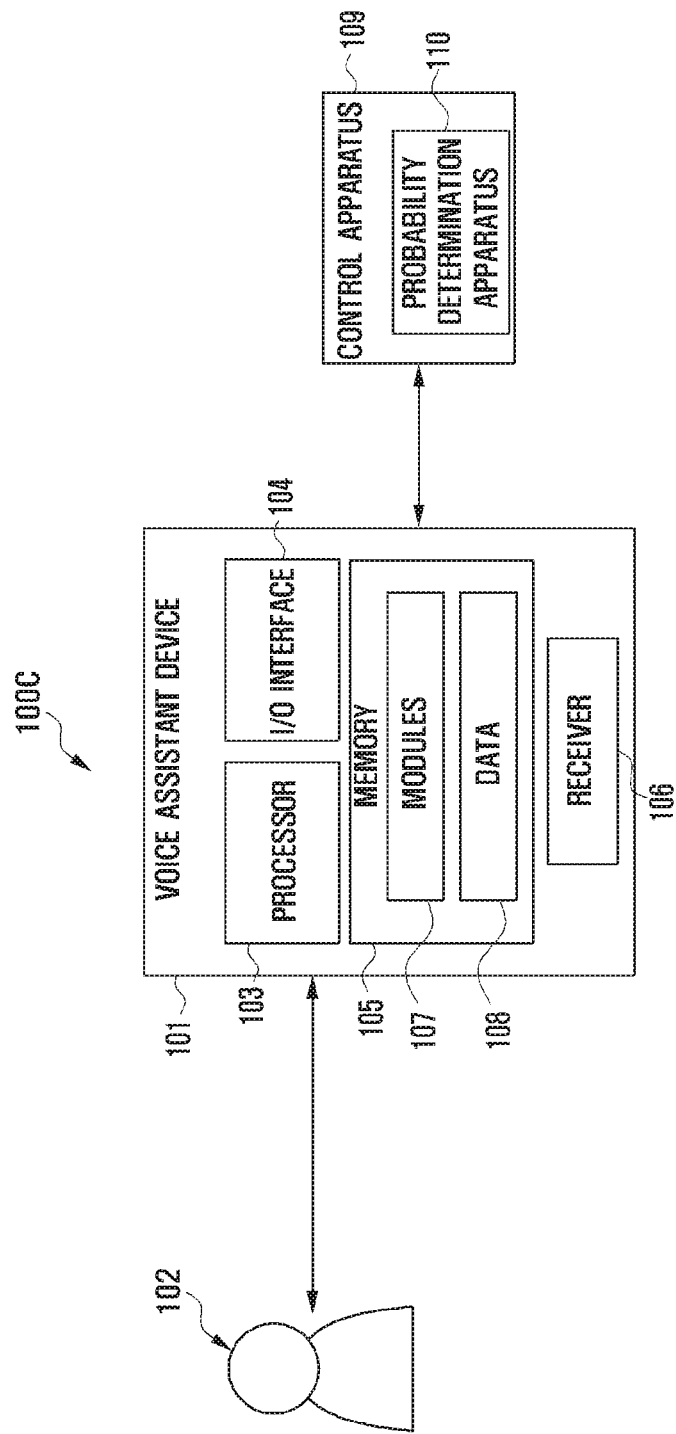

In an embodiment, the control apparatus 109 and the probability determination apparatus 110 may be integral part of the voice assistant device 101 as shown in FIG. 1B. The at least one voice input received by the receiver 106 may be used by the control apparatus 109 to control the voice assistant device 101, and the probability determination apparatus 110 to determine the probability of issuance of the subsequent voice input. In an embodiment, the probability determination apparatus 110 may be an integral part of the control apparatus 109 (not shown in FIG. 1B). In an embodiment, the control apparatus 109 and the probability determination apparatus 110 may be a dedicated server or a cloud-based server which is in communication with the voice assistant device 101, as shown in FIG. 1C. The voice assistant device 101 may communicate with such server via a communication network (not shown in figure). The communication network includes, but is not limited to, a direct interconnection, a Peer to Peer (P2P) network, Local Area Network (LAN), Wide Area Network (WAN), wireless network (e.g., using Wireless Application Protocol), Controller Area Network (CAN), the Internet, Wi-Fi, and such. The I/O interface 104 of the voice assistant device 101 may assist in transmitting and receiving data. Received data may include the at least one voice input, instructions from the control apparatus 109 and so on. Transmitted data may include the at least one voice input to the control apparatus 109, response to the at least one user 102 and so on.

Figure 2:
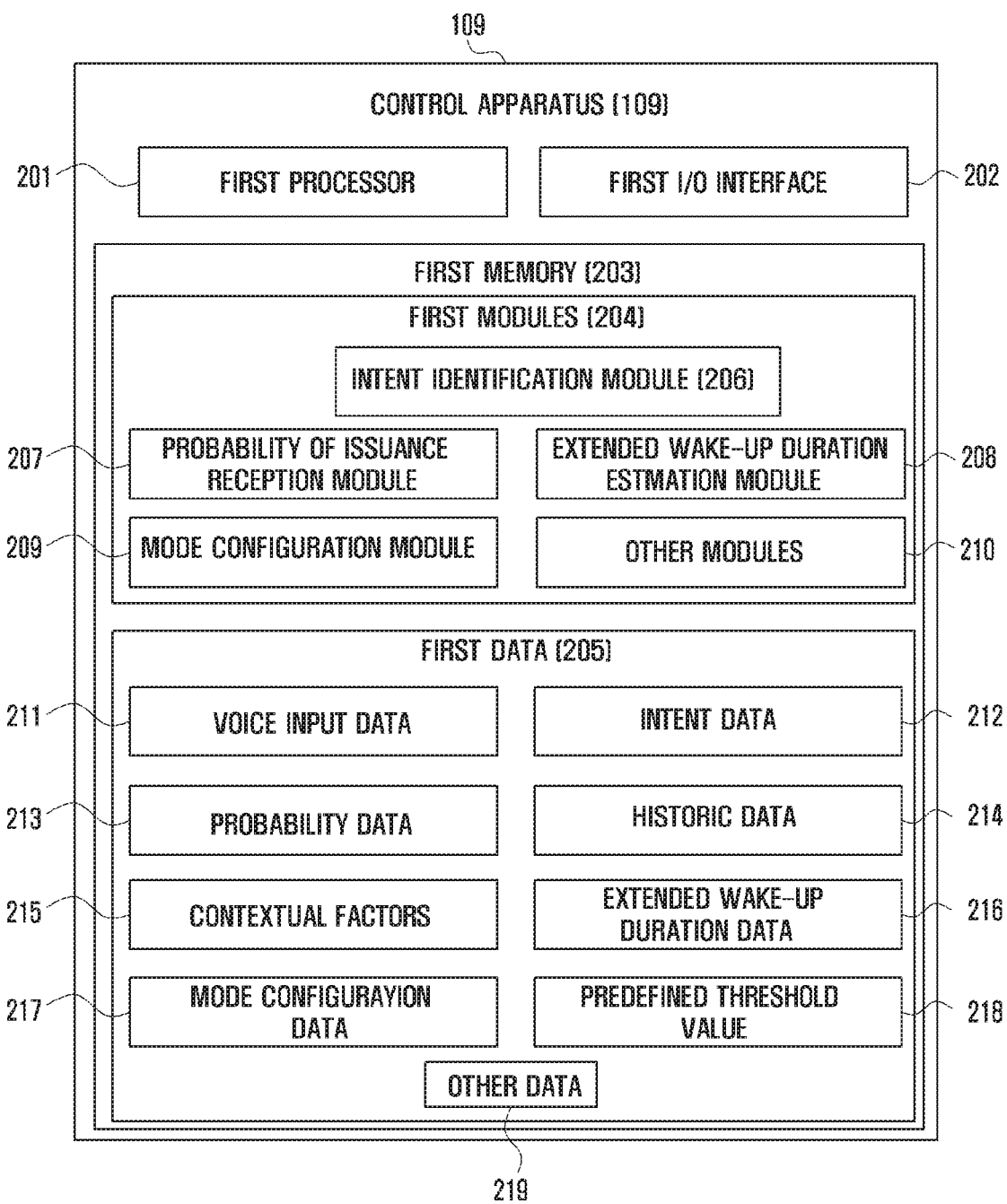
FIG. 2 shows a detailed block diagram of a control apparatus for controlling a voice assistant device, in accordance with some embodiments of the present disclosure.

FIG. 2 shows a detailed block diagram of the control apparatus 109 for controlling the voice assistant device 101, in accordance with some embodiments of the present disclosure.

The control apparatus 109 may include a first processor 201, first I/O interface 202 and a first memory 203. In some embodiments, the first memory 203 may be communicatively coupled to the first processor 201. The first memory 203 stores instructions, executable by the first processor 201, which, on execution, may cause the control apparatus 109 to control the voice assistant device 101. In an embodiment, the first memory 203 may include one or more first modules 204 and first data 205. The one or more first modules 204 be configured to perform the steps of the present disclosure using the first data 205, to provide control the voice assistant device 101. In an embodiment, each of the one or more first modules 204 may be a hardware unit which may be outside the first memory 203 and coupled with the control apparatus 109. The control apparatus 109 may be implemented in a variety of computing systems, such as a laptop computer, a desktop computer, a Personal Computer (PC), a notebook, a smartphone, a tablet, e-book readers, a server, a network server, and the like.

The first data 205 and the one or more first modules 204 in the first memory 203 of the control apparatus 109 may be described herein in detail.

In one implementation, the one or more first modules 204 may include, but are not limited to, an intent identification module 206, a probability of issuance determination module 207, an extended wake-up duration estimation module 208, mode configuration module 209 and one or more other modules 210, associated with the control apparatus 109.

In an embodiment, the first data 205 in the first memory 203 may comprise voice input data 211 (also referred to as at least one voice input 211), intent data 212 (also referred to as intent 212), probability data 213 (also referred to as probability of issuance 213), historic data 214, contextual factors 215 (also referred to as one or more contextual factors 215), extended wake-up duration data 216 (also referred to extended wake-up duration 216), mode configuration data 217, predefined threshold value 218 and other data 219 associated with the control apparatus 109.

In an embodiment, the first data 205 in the first memory 203 may be processed by the one or more first modules 204 of the control apparatus 109. In an embodiment, the one or more first modules 204 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

The control apparatus 109 may be configured to control the operation of the voice assistant device 101 based on at least one voice input 211 received by the voice assistant device 101. The at least one voice input 211 may be processed by the control apparatus 109 to control the voice assistant device 101. In an embodiment, each of voice inputs provided to the voice assistant device 101 may be dynamically provided to the control apparatus 109, to dynamically control the voice assistant device 101.

Upon receiving the at least one voice input 211, the intent identification module 206 of the control apparatus 109 may be configured to identify the intent 212 of the at least one voice input 211. In an embodiment, the intent 212 of the at least one voice input 211 may be identified by performing voice recognition, voice synthesis, NLU on the at least one voice input 211. In an embodiment, the conversation knowledge of previous voice inputs of the voice assistant device 101 may be used to determine the intent 212 of the received at least one voice input 211. One or more other processing techniques, known to a person skilled in the art, may be implemented in the intent identification module 206 to identify the intent 212 of the at least one voice input 211.

Further, the probability of issuance reception module 207 may be configured to receive the probability of issuance 213 of a subsequent voice input from the probability determination apparatus 110. In an embodiment, the probability determination apparatus 110 may be one of the other modules 210 of the control apparatus 109. In an embodiment, the probability determination apparatus 110 may be connected with the control apparatus 109 via a communication network. The probability determination apparatus 110 may determine the probability of issuance 213 and the probability of issuance reception module 207 may be configured to communicate with the probability determination apparatus 110 to receive the determined probability of issuance 213.

Figure 3:
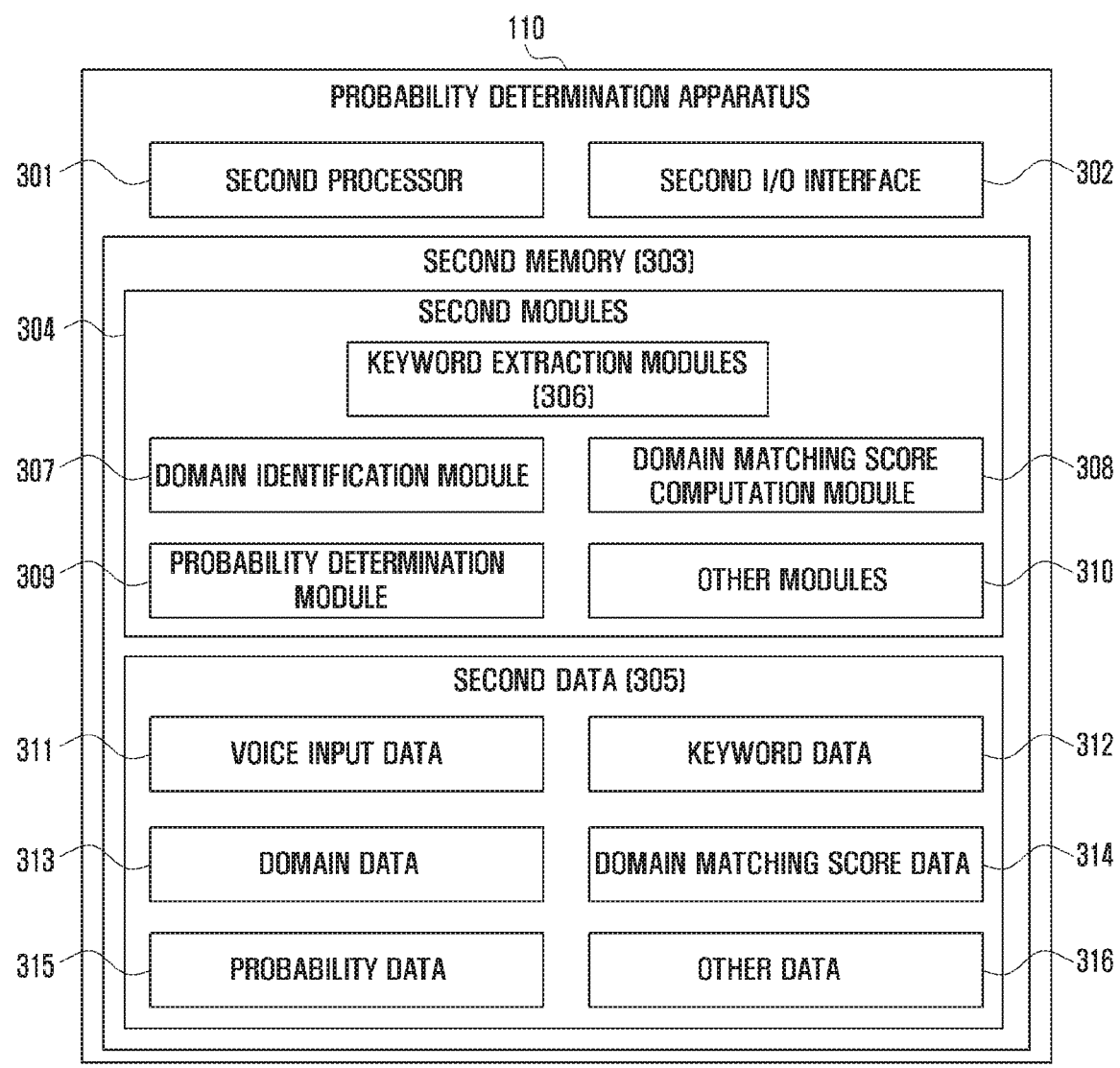
FIG. 3 shows a detailed block diagram of a probability determination apparatus for determining probability of issuance of a subsequent voice input to a voice assistant device, in accordance with some embodiments of the present disclosure.

FIG. 3 shows a detailed block diagram of the probability determination apparatus 110 for determining the probability of issuance 213, in accordance with some embodiments of the present disclosure.

The probability determination apparatus 110 may include a second processor 301, second I/O interface 302 and a second memory 303. In some embodiments, the second memory 303 may be communicatively coupled to the second processor 301. The second memory 303 stores instructions, executable by the second processor 301, which, on execution, may cause the probability determination apparatus 110 to determine the probability of issuance 213. In an embodiment, the second memory 303 may include one or more second modules 304 and second data 305. The one or more second modules 304 may be configured to perform the steps of the present disclosure using the second data 305, to determine the probability 213. In an embodiment, each of the one or more second modules 304 may be a hardware unit which may be outside the second memory 303 and coupled with the probability determination apparatus 110. The probability determination apparatus 110 may be implemented in a variety of computing systems, such as a laptop computer, a desktop computer, a Personal Computer (PC), a notebook, a smartphone, a tablet, e-book readers, a server, a network server, and the like.

The second data 305 and the one or more second modules 304 in the second memory 303 of the probability determination apparatus 110 may be described herein in detail.

In one implementation, the one or more second modules 304 may include, but are not limited to, keyword extraction module 306, a domain identification module 307, domain matching score computation module 308, probability determination module 309 and one or more other modules 310, associated with the probability determination apparatus 110.

In an embodiment, the second data 305 in the second memory 303 may comprise voice input data 311 (also referred to as at least one voice input 311), keyword data 312 (also referred to as one or more keywords 312), domain data 313 (also referred to as domain 313), domain matching score data 314 (also referred to as domain matching scores 314), probability data 315 (also referred to probability of issuance 315), and other data 316 associated with the probability determination apparatus 110. In an embodiment, the voice input data 211 in the first memory 203 of the control apparatus 109 may be same as the voice input data 311 in the second memory 303 of the probability determination apparatus 110. In an embodiment, the probability data 214 in the first memory 203 of the control apparatus 109 may be same as the probability data 315 in the second memory 303 of the probability determination apparatus 110.

In an embodiment, the second data 305 in the second memory 303 may be processed by the one or more second modules 304 of the probability determination apparatus 110. In an embodiment, the one or more second modules 304 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

The keyword extraction module 306 may be configured to extract the one or more keywords 312 from plurality of words in the at least one voice input 311. In an embodiment, the keyword extraction module 306 may be configured to identify the plurality of words in the at least one voice input 311. Once the plurality of words are identified, each of the plurality of words are assigned weights. In an embodiment, each of the plurality of words are assigned weights based on the intent 212 of the at least one voice input 311. For example, words which are in closer relation with the intent 212 of the at least one voice input 311 may be assigned with higher weights and words which are least related to the intent 212 may be assigned with lower weights. Further, the keyword extraction module 306 may be configured to identify words with weightage greater than a predefined weightage value, to be the one or more keywords 312 of the at least one voice input 311. Such one or more keywords 312 represent the at least one voice input 311. The domain identification module 307 may be configured to use the one or more keywords 312 to identify the domain 313 associated with the at least one voice input 311. In an embodiment, the probability determination apparatus 110 may be associated with a repository which include plurality of pre-stored domains related to the voice assistant device 101. In an embodiment, the plurality of pre-stored domains may be identified and stored in the repository based on previous voice inputs or requests from the at least one user 102. In an embodiment, the plurality of pre-stored domains may include entertainment, news, sports, music, appliance configurations and so on. Further, each of the plurality of pre-stored domains may be associated with corresponding keywords. Upon extracting the one or more keywords 312 from the at least one voice input 311, the one or more keywords 312 may be matched with keywords of the plurality of pre-stored domains. By such matching, the domain 313 associated with the at least one voice input 311 may be identified by the domain identification module 307.

Further, the domain matching score computation module 308 may be configured to compute domain matching scores 314 for the identified domain 313. In an embodiment, the domain matching scores 314 may be computed for the domain 313 with each of the plurality of pre-stored domains. Further, based on the domain matching scores 314, the probability determination module 309 of the probability determination apparatus 110, may be configured to determine the probability of issuance 315 of the subsequent voice input to the voice assistant device 101. Further, for determining the probability 315, the one or more contextual factors 215 and the historic data 214 are also considered along with the domain matching scores 314. In an embodiment, the historic data 214 may include past requests of the at least one user 102 and corresponding response provided by the voice assistant device 101. In an embodiment, the historic data 214 may include time of request, day of request, location of request, and other data related the past requests from the at least one user 102. In an embodiment, the one or more contextual factors 215 include at least one of user related factors, time related factors data and environment related factors. For example, upon waking-up, consider the at least one user 102 has a habit to the trigger the voice assistant device 101 and give commands to retrieve information related to weather, news and traffic. In that case, upon receiving initial command from the at least one user 102 in morning, the probability of issuance 315 of subsequent voice input may be determined to be high. Similarly, consider the at least one user 102 is asking questions related to a single domain continuously. Since, there is possibility that the at least one user 102 may ask further questions related to the single domain, the probability 315 may be determined to be high. Further, consider the user commands to switch on TV and then engages in a phone call. In such case, the probability 315 may be determined to be low, since possibility of receiving further commands from the at least one user 102 is low.

In an embodiment, other modules 310 of the probability determination apparatus 110 may include conversation knowledge building module which is configured to build the conversation knowledge for the at least one voice input 311, based on the one or more extracted keywords 312. Such conversation knowledge may be built for each conversation of the at least one user 102 with the voice assistant device 101. In an embodiment, the conversation knowledge may be stored in the repository.

In an embodiment, the intent identification module 206 may be configured to use the conversation knowledge of previous conversations of the at least one user 102, to identify the intent 212 of the at least one voice input 211.

The probability of issuance 315 is determined by the probability determination apparatus 110 and provided to the control apparatus 109. Based on the probability 213, the extended wake-up duration estimation module 208 may be configured to determine the extended wake-up duration 216 for the voice assistant device 101. Initially, the probability 213 is compared with the predefined threshold value 218. In case, the determined probability 213 is greater than the predefined threshold value 218, extended wake-up duration 216 of the voice assistant device 101 may be determined. Further, the duration of the wake-up mode of the voice assistant device 101 may be extended for the extended wake-up duration 216, to receive the subsequent voice input from the at least one user 102. In an embodiment, the predefined threshold value 218 may be determined by analysing the historic data 214, through devices connected to the voice assistant device 101. For example, if the at least one user 102 frequently indulges in deep conversations with the voice assistant device 101, the predefined threshold value 218 may be selected to be of a lower value. In case, even with lesser value of the probability 213, the extended wake-up duration 216 may be determined. Similarly, consider the at least one user 102 mainly uses the voice assistant device 101 to control the home appliances and less for retrieving news updates. When the intent 212 is related to news updates, the predefined threshold value 218 may be set to higher value, since higher probability is required to extend the wake-up duration.

In an embodiment, the extended wake-up duration 216 may be estimated to be directly proportional to the probability of issuance 213 of the subsequent voice input. For example, if the determined probability 213 is high, the extended wake-up duration 216 may be determined to be for a longer duration. Similarly, when the determined probability 213 is low but equal or greater than the predefined threshold value 218. The extended wake-up duration 216 may be determined to be for a shorter duration.

Further, upon determining the extended wake-up duration 216, the mode configuration module 209 may configure the voice assistant device 101 to operate in the wake-up mode for the extended wake-up duration 216. In an embodiment, when the probability 213 is determined to be lesser than the predefined threshold value 218, the mode configuration module 209 may configure the voice assistant device 101 to be operated in the sleep-mode, until a trigger to operate in the wake-up mode is detected. Further, during the extended wake-up duration 216, if absence of the subsequent voice input is detected, the mode configuration module 209 may configure the voice assistant device 101 to be operated in the sleep-mode. Mode at which the voice assistant device 101 is to be operated is stored as the mode configuration data 217. The mode configuration data 217 may be one of the sleep mode and the wake-up mode.

The other data 219 and 316 may store data, including temporary data and temporary files, generated by modules for performing the various functions of the control apparatus 109 and the probability determination apparatus 110. The one or more first modules 204 and the one or more second modules 304 may also include other modules 211 and 311, respectively, to perform various miscellaneous functionalities of the control apparatus 109 and the probability determination apparatus 110. It will be appreciated that such modules may be represented as a single module or a combination of different modules.

Figure 4A:
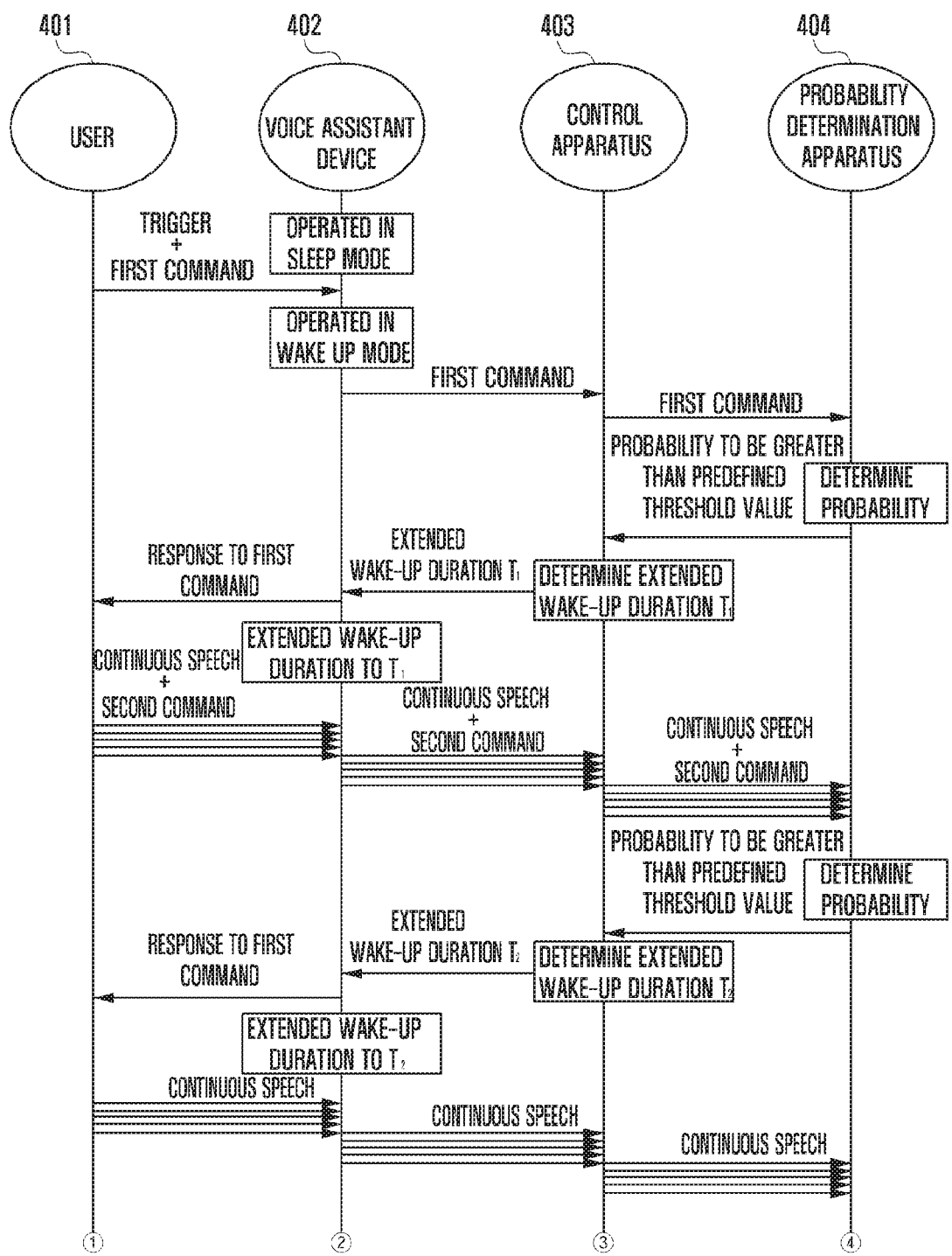
FIGS. 4A-4B illustrate schematic diagram for controlling a voice assistant device, in accordance with some embodiments of present disclosure.
Figure 4B:
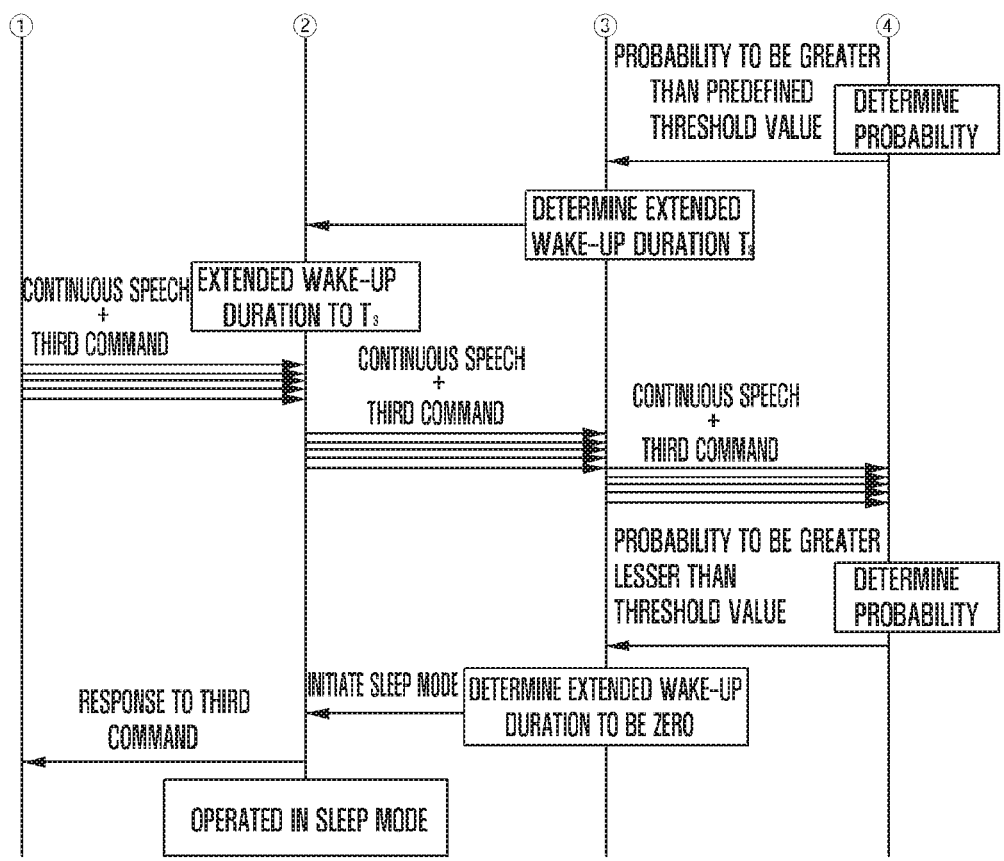

FIGS. 4A and 4B illustrate a schematic diagram for controlling the voice assistant device 101, in accordance with some embodiments of present disclosure. Consider user 401 is associated with a voice assistant device 402. The voice assistant device 402 may be controlled by the control apparatus 403 using a probability determination apparatus 404.

Initially, the voice assistant device 402 may be operated in the sleep mode. When a trigger and a first command is received from the user 401, the voice assistant device 402 may be operated in a wake-up mode. The control apparatus 403 receives the first command which is provided to determine the probability of issuance by the probability determination apparatus 404. When the probability is greater than the predefined threshold value, the extended wake-up duration $T_1$ with respect to the first command is determined. Along with response to the first command, the wake-up mode of the voice assistant device 402 is extended to the extended wake-up duration $T_1$. Some of use cases in association with controlling the voice assistant device 402 is described below.

Figure 5A:
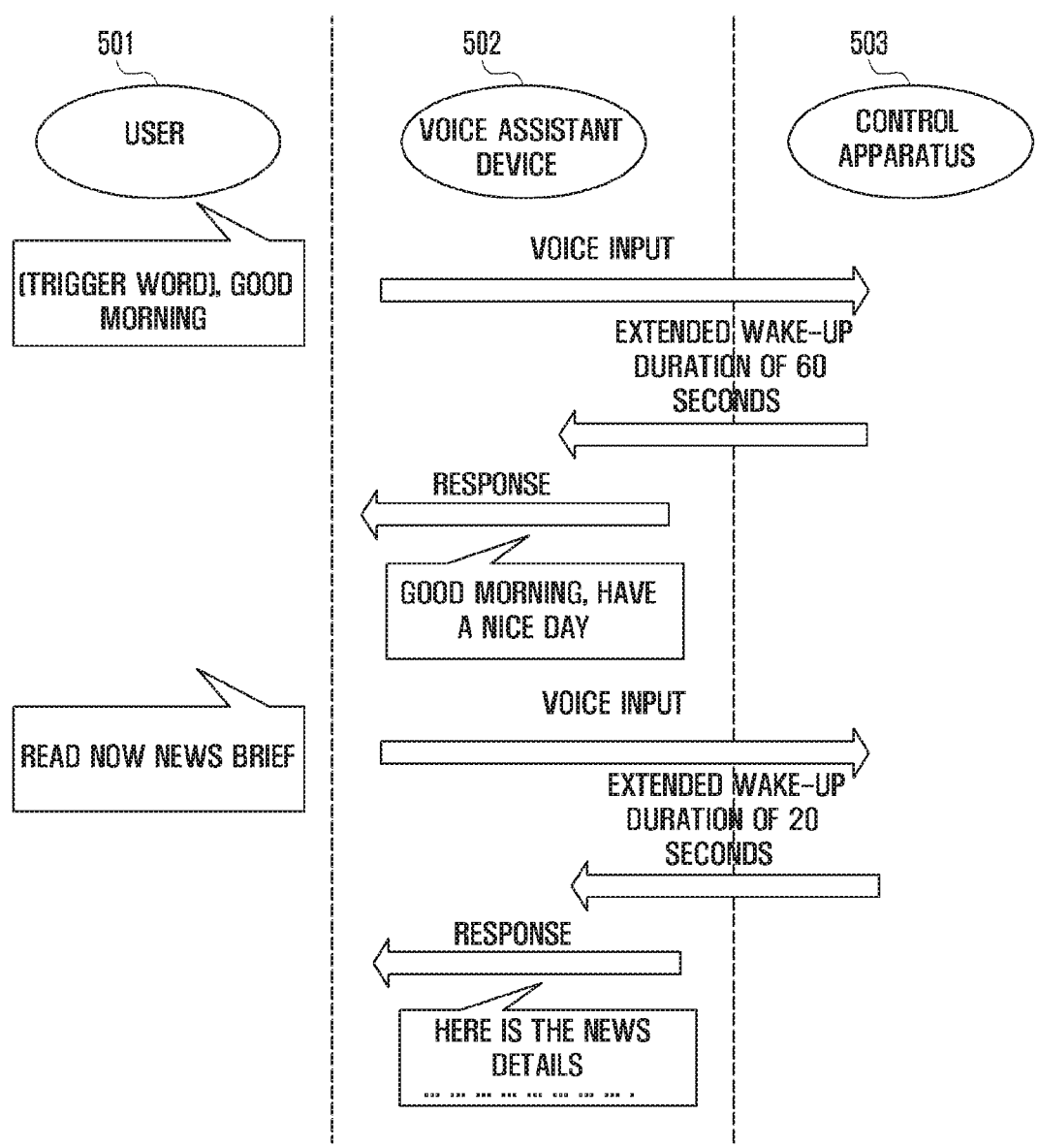
FIGS. 5A-5F illustrate various embodiments of a voice assistant device, in accordance with some embodiments of present disclosure.

Consider the embodiment illustrated in FIG. 5A. Consider user 501 has a habit of requesting news updates from a voice assistant device 502 at mornings. The user 501 initiates service of the voice assistant device 502 by providing voice input as "(TRIGGER WORD), GOOD MORNING". The voice input is received by the voice assistant device 502 and provided to the control unit 503 including the probability determination apparatus (not shown in the various embodiments). Since historic data includes to request further requests from the user 501, probability of issuance of subsequent voice inputs may be determined to be higher. Hence, the extended wake up duration may be determined to be for a longer duration. For example, in such cases, the extended wake-up duration may be 60 seconds. Using Natural Language Generation (NLG), the response to the voice input may be provided as "GOOD MORNING, HAVE A NICE DAY". Along with the response, the wake-up duration may also be extended to 60 seconds. As predicted, the user 501 may provide subsequent voice input as "READ NEWS UPDATES". The voice input is received by the voice assistant device 502 and provided to the control apparatus 503. Since historic data of the user 501 indicates that the user 501 usually requests for only news updates at mornings, and also that the news updates are already provided to the user 501, the probability may be low. Accordingly, the extended wake-up duration may be for shorter duration. For example, the extended wake-up duration in relation to subsequent voice input may be 20 seconds. Using NLG, the response to the voice input may be provided as "HERE IS THE NEWS UPDATE . . . ". Along with the response, the wake-up duration may also be extended to 20 seconds. If no voice inputs are received within said 20 seconds, the voice assistant device 502 may be configured to be in the sleep mode.

Figure 5B:
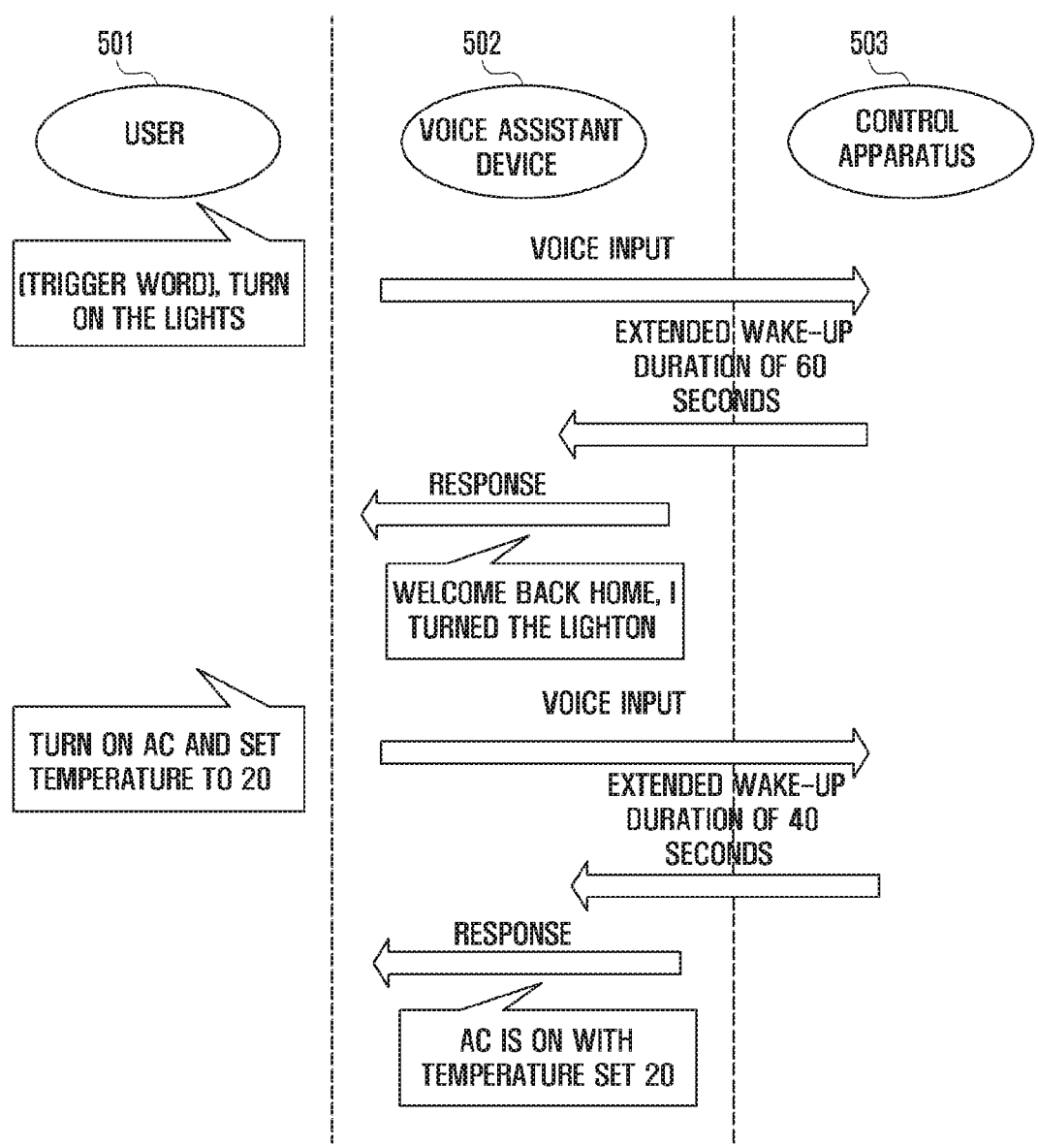

Consider the embodiment illustrated in FIG. 5B. Consider user has a habit of controlling home appliances as soon as he enters home from office in evening. The user 501 initiates service of the voice assistant device 502 by providing voice input "(TRIGGER WORD), TURN ON THE LIGHTS". The voice input is received by the voice assistant device 502 and provided to the control apparatus 503 and historic data includes to request further requests, probability of issuance of subsequent voice inputs may be determined to be higher and also, the extended wake up duration may be determined to be for a longer duration. For example, in such cases, the extended wake-up duration may be 60 seconds. The voice assistant device 502 may turn ON the lights and using NLG, the response to the voice input may be provided as "WELCOME BACK HOME, I TURNED THE LIGHTS ON". Along with the response, the wake-up duration may also be extended to 60 seconds. As predicted, the user 501 provides subsequent voice input as "TURN ON AC AND SET TEMPERATURE TO 20". The voice input is received by the voice assistant device 502 and provided to the control apparatus 503. Since historic data of the user 501 indicates that several home appliances are controlled at evening, the probability may be high. Accordingly, the extended wake-up duration may be for longer duration but shorter than previous wake-up duration. For example, the extended wake-up duration in relation to subsequent voice input may be 40 seconds. The voice assistant device 502 may turn AC ON and set temperature to 20. Further, using NLG, the response to the voice input may be provided as "AC IS ON WITH TEMPERATURE SET TO 20". Along with the response, the wake-up duration may also be extended to 40 seconds and further voice inputs from the user 501 is awaited in span of 40 seconds. If no voice inputs are received within said 40 seconds, the voice assistant device 502 may be configured to be in the sleep mode.

Figure 5C:
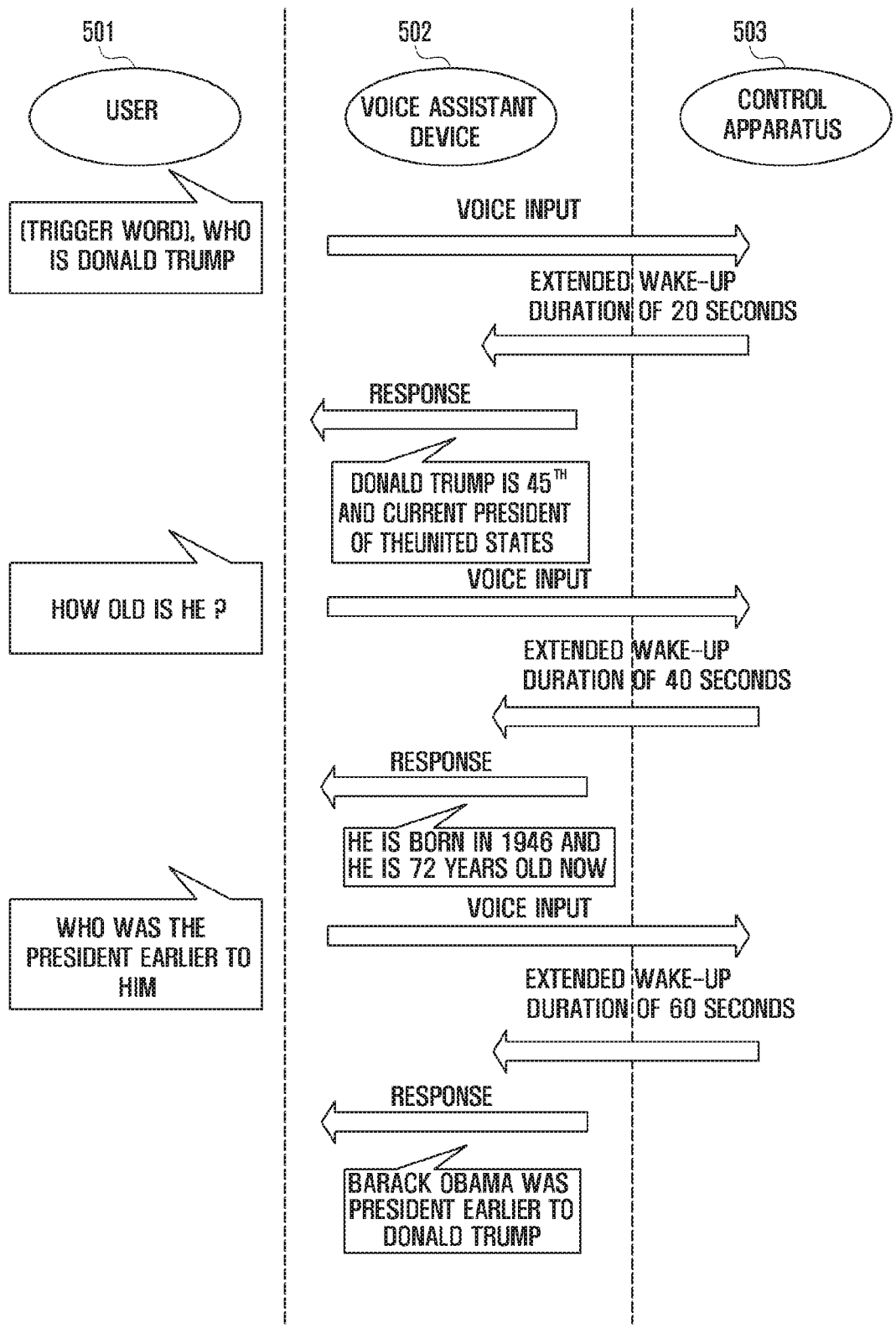

Consider the embodiment illustrated in FIG. 5C where the user 501 is in deep conversation with the voice assistant device 502. Deep conversation may include several questions, related to a single context, from the user 501. The user 501 initiates service of the voice assistant device 502 by providing voice input "(TRIGGER WORD), WHO IS DONALD TRUMP". The voice input is received by the voice assistant device 502 and provided to the control apparatus 503. The voice input may be of new context with respect past requests to the user and hence, the determined probability may be of lower value. However if the user 501 has previously indulged in deep conversations with the voice assistant devices 502, the probability may be greater than the predefined threshold value. Therefore, the extended wake-up duration may be for shorter period of time. For example, in such cases, the extended wake-up duration may be 20 seconds. The voice assistant device 502 may use NLG and provide the response to the voice input as "DONALD TRUMP IS 45$^{TH}$ AND CURRENT PRESIDENT OF THE UNITED STATES". Along with the response, the wake-up duration may also be extended to 20 seconds. The user 501 provides subsequent voice input as "HOW OLD IS HE?" within 20 seconds duration. The voice input is received by the voice assistant device 502 and provided to the control apparatus 503. Since the subsequent voice input is related to previous voice input, the probability of receiving subsequent voice input may be determined to be high. Accordingly, the extended wake-up duration may be for longer duration than the previous wake-up mode duration. For example, the extended wake-up duration in relation to the subsequent voice input may be 40 seconds. Using NLG, the response to the voice input may be provided as "HE IS BORN IN 1946 AND HE IS 72 YEARS OLD". Along with the response, the wake-up duration may also be extended to 40 seconds and further voice inputs from the user 501 is awaited in span of 40 seconds. If no voice inputs are received within said 40 seconds, the voice assistant device 502 may be configured to be in the sleep mode. The user 501 provides subsequent voice input as "WHO WAS THE PRESIDENT EARLIER TO HIM?" within 40 seconds duration. The voice input is received by the voice assistant device 502 and provided to the control apparatus 503. Again, since the subsequent voice input is related to previous voice inputs, the probability of receiving subsequent voice input may be determined to be high. Accordingly, the extended wake-up duration may be for longer duration than the previous wake-up mode durations. For example, the extended wake-up duration in relation to the subsequent voice input may be 60 seconds. Using NLG, the response to the voice input may be provided as "BARACK OBAMA WAS PRESIDENT EARLIER TO DONALD TRUMP". Along with the response, the wake-up duration may also be extended to 60 seconds and further voice inputs from the user 501 is awaited in span of 60 seconds. If no voice inputs are received within said 60 seconds, the voice assistant device 502 may be configured to be in the sleep mode.

Referring back to FIGS. 4A and 4B, consider the user 401 is indulged in continuous speech and provides a second command during the extended wake-up duration $T_1$, in that case the continuous speech along with the second command is received by the voice assistant device 402 and provided to the control apparatus 403 and the probability determination apparatus 404. When the probability determined for the second command is greater than the predefined threshold value, the extended wake-up duration $T_2$ with respect to the second command is determined. Along with response to the second command, the wake-up mode of the voice assistant device 402 is extended to the extended wake-up duration $T_2$. Consider, further the user 401 is indulged only in continuous speech without any command to the voice assistant device 502. The continuous speech in the extended wake-up duration $T_2$ is received. Based on the intent of the continuous speech, the probability with respect to the continuous speech may be determined. If the continuous speech is related to context of previous command, the probability may be higher than the predefined threshold value. If the continuous speech is not related to context of previous command, the probability may be lesser than the predefined threshold value. Consider the probability is greater than the predefined threshold value, the extended wake-up duration $T_3$ with respect to the second command is determined. The wake-up mode of the voice assistant device 502 is extended to the extended wake-up duration $T_3$.

Figure 5D:
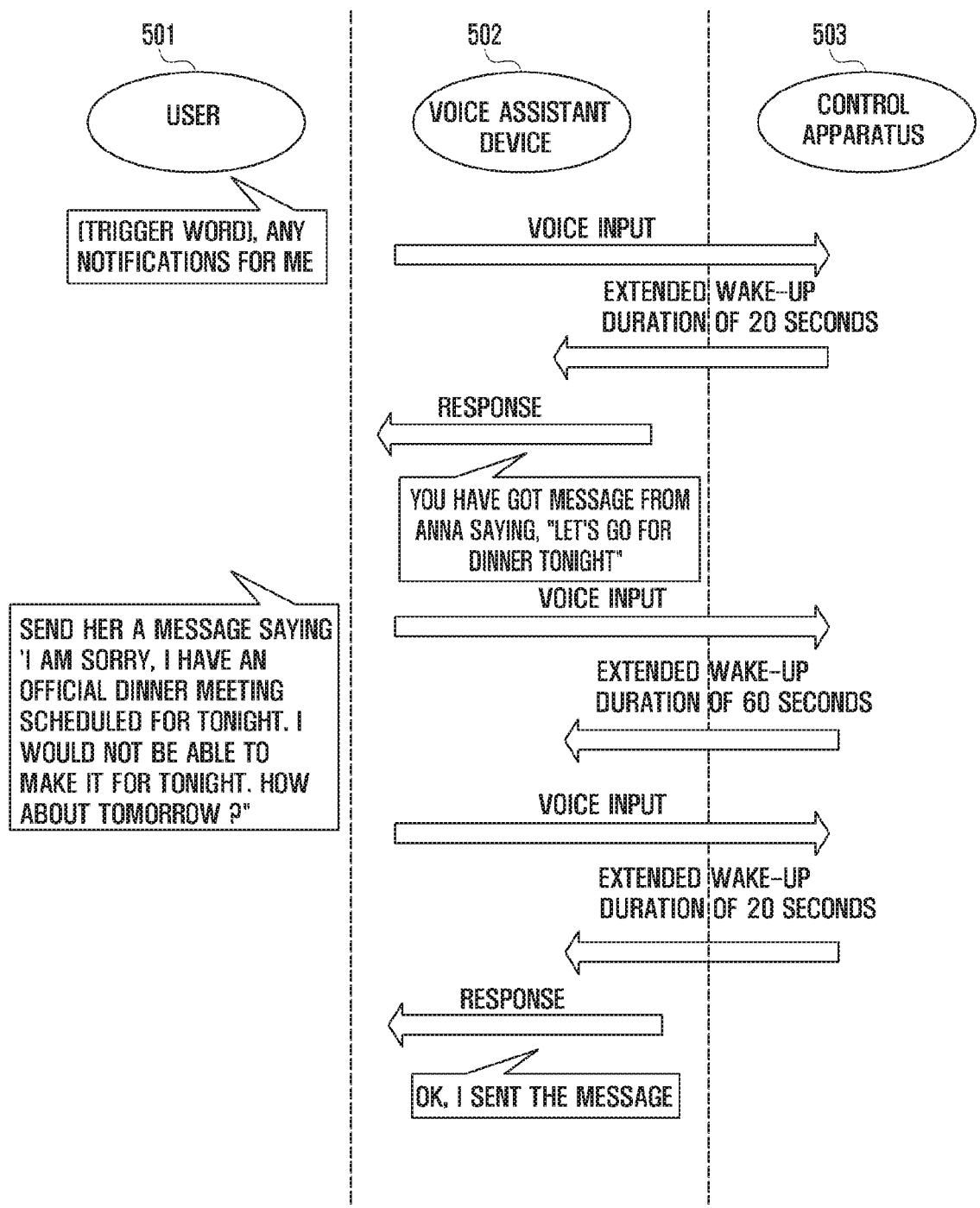

Consider the embodiment illustrated in FIG. 5D where the user 501 initiates service of the voice assistant device 502 by providing voice input "(TRIGGER WORD), ANY NOTIFICATION FOR ME". The voice input is received by the voice assistant device 502 and provided to the control apparatus 503. The voice input may be associated with onetime request and hence, the determined probability may be of lower value. Therefore, the extended wake-up duration may be for shorter period of time. For example, in such cases, the extended wake-up duration may be 20 seconds. The voice assistant device 502 may use NLG and provide the response to the voice input as "YOU HAVE GOT MESSAGE FROM ANNA SAYING, "LET'S GO FOR DINNER TONIGHT". Along with the response, the wake-up duration may also be extended to 20 seconds. The user 501 provides subsequent voice input as a continuous speech as "SEND HER A MESSAGING SAYING, "I AM SORRY, I HAVE AN OFFICIAL DINNER MEETING SCHEDULED FOR TONIGHT. I WOULD BOT BE ABLE TO MAKE IT FOR TONIGHT. HOW ABOUT TOMORROW?". The voice input is a continuous speech lasts for more than 20 seconds. Also, since the subsequent voice input is related to previous voice input, the probability of receiving subsequent voice input may be determined to be high. Accordingly, the extended wake-up duration may be for longer duration than the previous wake-up mode duration. For example, the extended wake-up duration in relation to the subsequent voice input may be 60 seconds. However, if the voice input is still received from the user 501, the control apparatus 503 may be configured to further extend the wake-up mode duration of the voice assistant device 502. Process of extending the wake-up mode duration may continue until the voice inputs is completed received and there is not voice input for predefined duration of time. For example, initially, the wake-up duration was extended to 60 seconds and further extended to 20 seconds. Upon completion of the extended wake-up duration, using NLG, the response to the voice input may be provided as "OK, I SENT THE MESSAGE". The voice assistant device 502 may be configured to be in the sleep mode upon sending the response.

Figure 5E:
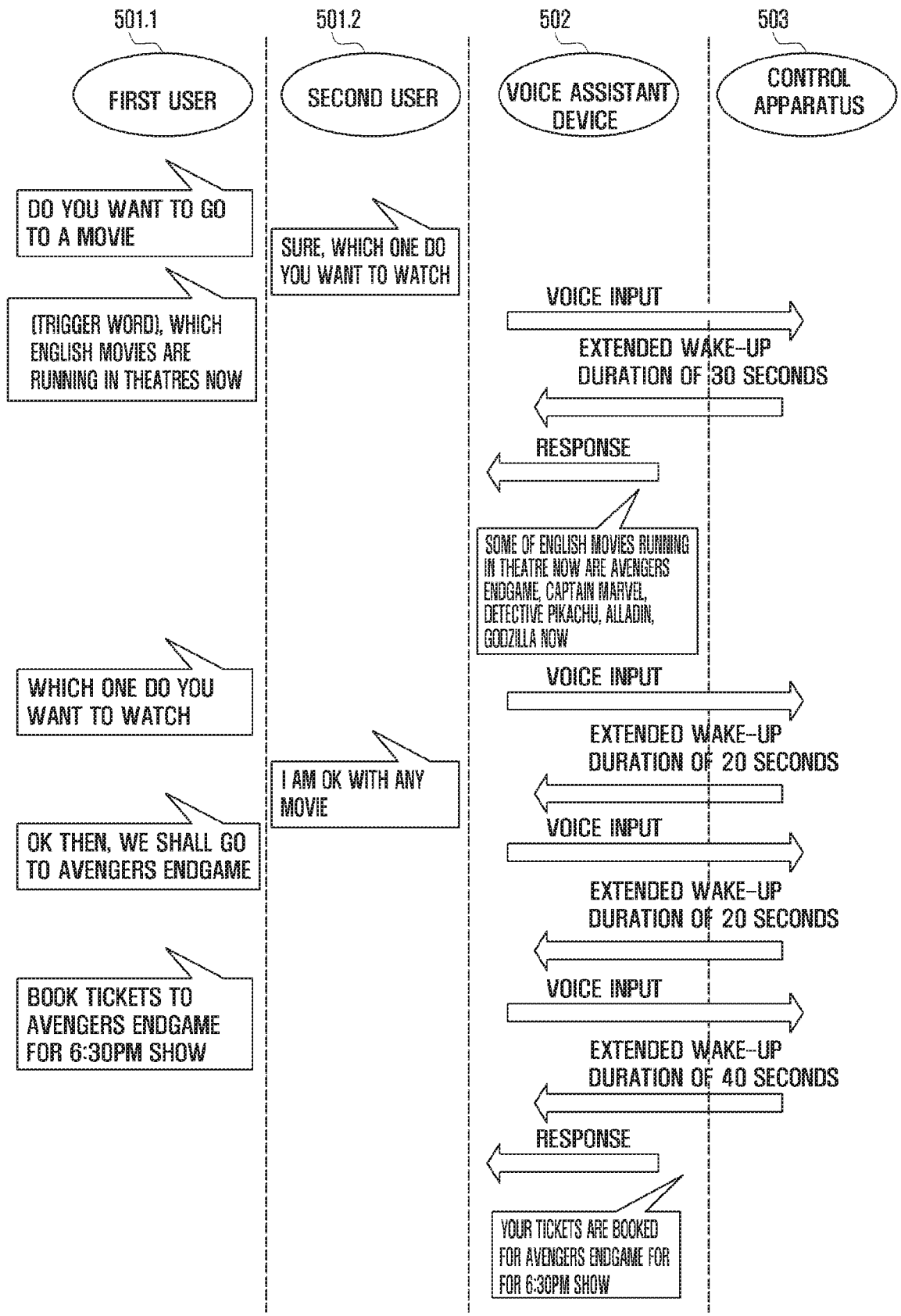

Consider the embodiment illustrated in FIG. 5E where first user 501.1 and second user 501.2 are indulged in a conversation. The first user 501.1 may converse with the second user 501.2 saying "DO YOU WANT TO GO TO A MOVIE". The second user 501.2 may reply saying "SURE WHICH ONE DO YOU WANT TO WATCH". Since, none of the first user 501.1 and the second user 501.2 have said trigger word, the voice assistant device 502 may still be the sleep-mode. Further, the first user 501.1 initiates service of the voice assistant device 502 by saying "(TRIGGER WORD), WHICH ENGLISH ARE RUNNING IN THEATRES NOW". The voice input is received by the voice assistant device 502 and provided to the control apparatus 503. The probability of the voice input may be determined to be greater than the predefined threshold value and the extended wake-up duration may be determined to be 30 seconds. The voice assistant device 502 may use NLG and provide the response to the voice input as "SOME OF ENGLISH MOVIES RUNNING IN THEATRE NOW ARE AVENGERS: ENDGAME, CAPTAIN MARVEL, DETECTIVE PIKACHU, ALADDIN, GODZILLA".

Along with the response, the wake-up duration may also be extended to 30 seconds. Upon hearing to the response, the first user 501.1 indulges in a conversation with the second user 501.2 saying, "WHICH ONE DO YOU WANT TO WATCH". The second user 501.2 may reply to the first user 501.1 saying, "I AM OK WITH ANY MOVIE". For which, the first user 501.1 replies saying, "OK THEN, WE SHALL GO TO AVENGERS: ENDGAME". During the conversation between the first user 501.1 and the second user 501.2, the voice assistant device 502 may be configured to receive voice inputs from the first user 501.1 and the second user 501.2 and provide the voice inputs to the control apparatus 503. During the conversation, since each of the voice inputs are relevant to initial request from the first user 501.1, the control apparatus 503 the probability to be greater than the predefined threshold value. Also, the wake-up duration of the voice assistant device 502 may be increased until further request is received to the voice assistant device 502. For example, as shown in the figure, the wake-up mode may be extended, initially, to 20 seconds, further to 20 seconds and 40 seconds. When the first user 501.1 says "BOOK TICKETS TO AVENGERS: ENDGAME FOR 6:30 PM SHOW", the voice assistant device 502 may detect the voice input to be a request and accordingly respond. The voice assistant device 502 may book tickets and using NLG, may response, saying, "YOUR TICKETS ARE BOOKED FOR AVENGERS: ENDGAME FOR 6:30 PM SHOW". Since the task is completed, the voice assistant device 502 may be configured to be in the sleep mode upon sending the response.

Referring back to FIGS. 4A and 4B, consider the user 401 is indulged in continuous speech and provides a third command during the extended wake-up duration $T_1$. In that case, the continuous speech along with the second command is received by the voice assistant device 402 and provided to the control apparatus 403 and the probability determination apparatus 404. When the probability determined for the second command is lesser than the predefined threshold value, the extended wake-up duration may be determined to be zero. Along with response to the second command, the voice assistant device 402 may be configured to operate in the sleep-mode.

Figure 5F:
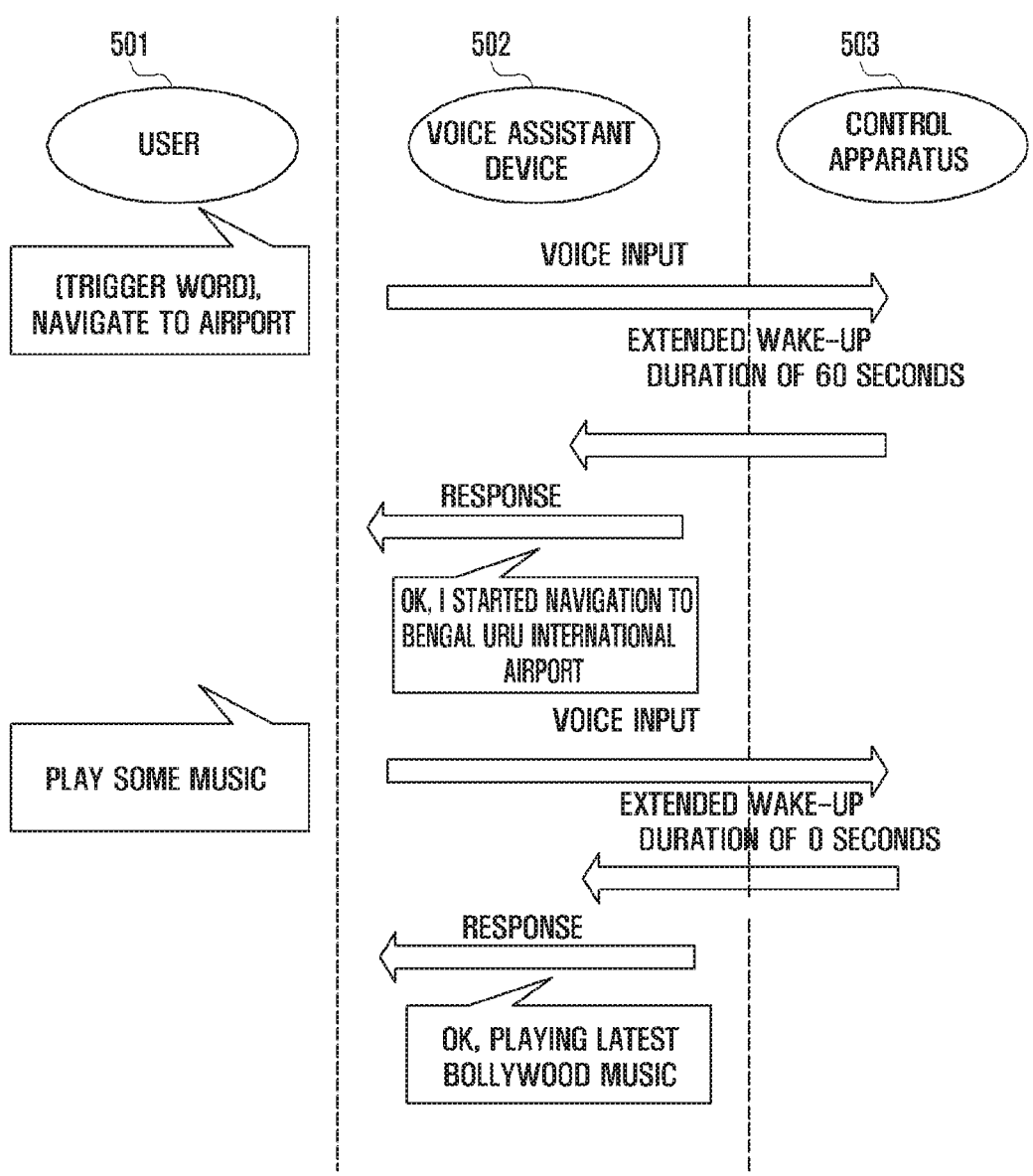

Consider the embodiment illustrated in FIG. 5F. Consider the user 501 has a habit of playing music using the voice assistant device 502 in a vehicle, as soon as he gets into the vehicle. The user 501 initiates service of the voice assistant device 502 by providing voice input "(TRIGGER WORD), NAVIGATE TO AIRPORT". The voice input is received by the voice assistant device 502 and provided to the control apparatus 503. Since, request for music is still not received, the probability of issuance of subsequent voice inputs may be determined to be higher and also, the extended wake up duration may be determined to be for a longer duration. For example, in such cases, the extended wake-up duration may be 60 seconds. The voice assistant device 502 may provide navigation to the airport and using NLG, the response to the voice input may be provided as "OK, I STARTED NAVIGATION TO BENGALURU INTERNATIONAL AIRPORT". Along with the response, the wake-up duration may also be extended to 60 seconds. As predicted, the user 501 provides subsequent voice input as "PLAY SOME MUSIC". The voice input is received by the voice assistant device 502 and provided to the control apparatus 503. Since the expected request is already received, the probability may be determined to be lesser than the predefined threshold value. Hence, the extended wake-up duration may be determined to be zero. Using the NLG, the response may be provided as "OK, PLAYING LATEST BOLLYWOOD MUSIC". Also, the voice assistant device 502 may be configured to be in the sleep mode.

Figure 6A:
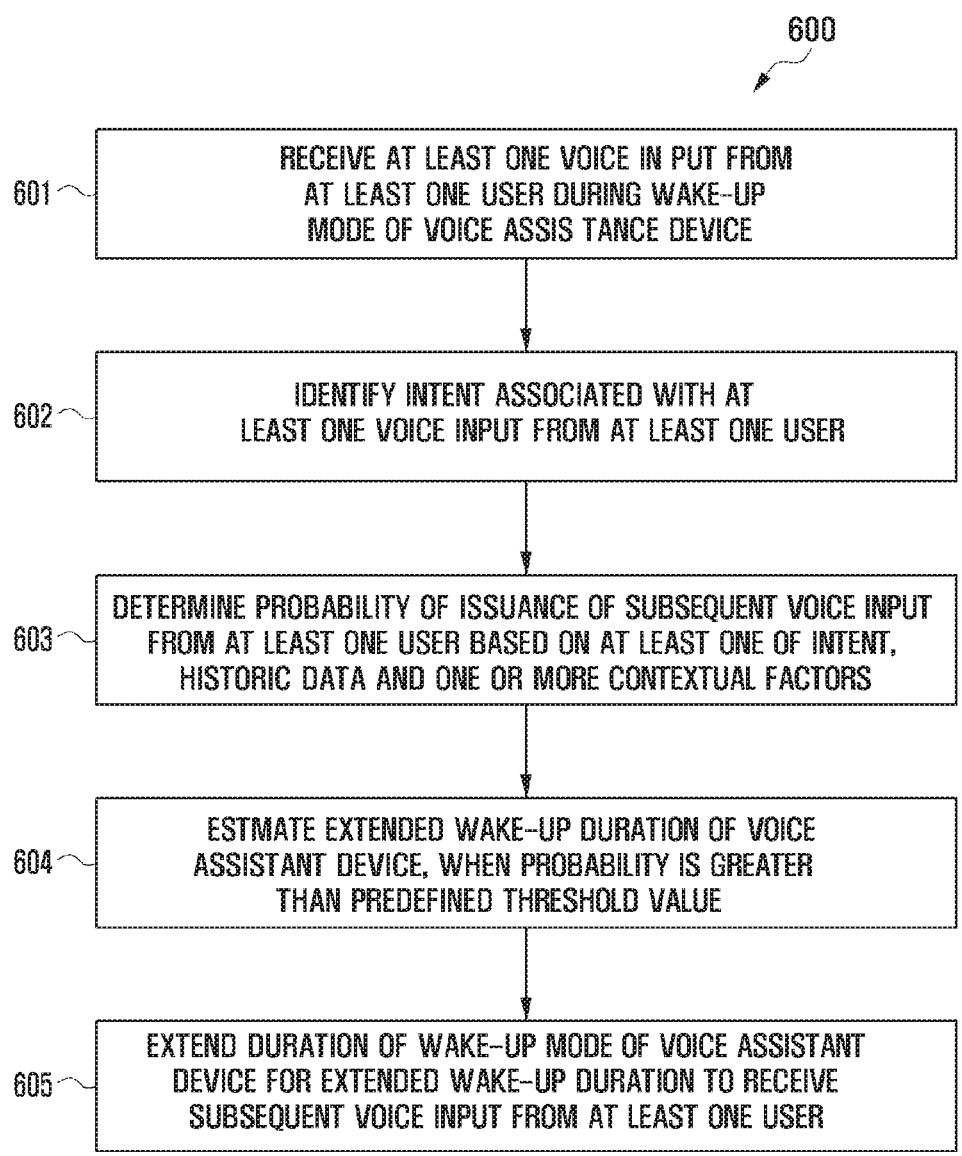
FIG. 6A shows a flow diagram illustrating a method for controlling a voice assistant device, in accordance with some embodiments of present disclosure.

FIG. 6A illustrates a flowchart showing a method 600 of the voice assistant device 101, in accordance with some embodiments of present disclosure.

At block 601, the voice assistant device 101 may be configured to receive the at least one voice input from at least one user 102 during the wake-up mode of the voice assistance device. In an embodiment, the at least one voice input may be dynamically received from the voice assistant device 101.

At block 602, the voice assistant device 101 may be configured to identify intent associated with the at least one voice input from the at least one user 102. In an embodiment, conversation knowledge of previous voice inputs from the at least one user 102 may be used to identify the intent.

Figure 6B:
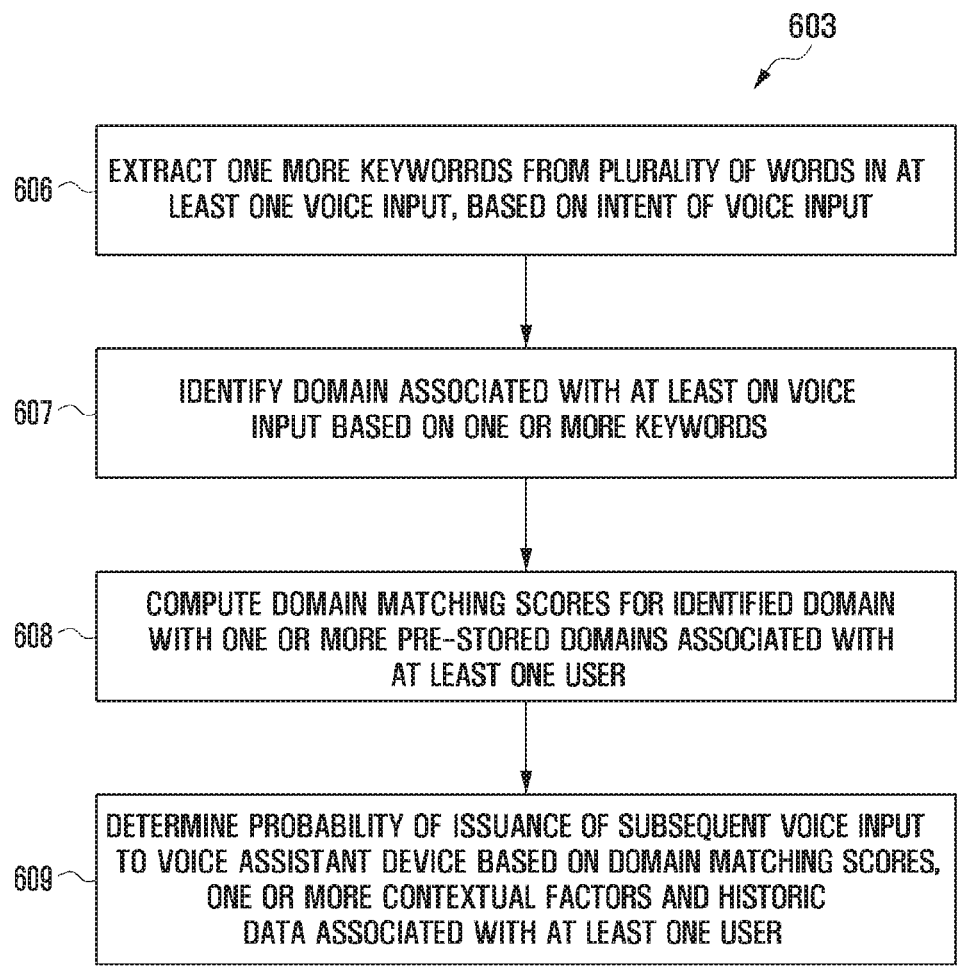
FIG. 6B shows a flow diagram illustrating a method for determining probability of issuance of a subsequent voice input to a voice assistant device, in accordance with some embodiments of present disclosure.

At block 603, the voice assistant device 101 determines the probability of issuance of subsequent voice inputs. The probability of issuance of the subsequent voice input may be determined based on the intent, the historic data and the one or more contextual factors. FIG. 6B illustrates a flowchart showing a method 603 for determining the probability of issuance of the subsequent voice input, in accordance with some embodiments of present disclosure.

At block 606, the voice assistant device 101 may be configured to extract one or more keywords from the plurality of words in the at least one voice input, based on the intent of the voice input. For extracting the one or more keywords, weightage is assigned to each of the plurality of words of the at least one voice input. Further, keywords in the plurality of words with weightage greater than a predefined weightage value are identified to be the one or more keywords.

At block 607, the voice assistant device 101 may be configured to identify the domain associated with the at least one voice input based on the one or more keywords. One or more techniques, known to a person skilled in the art, may be implemented to identify the domain.

At block 608, the voice assistant device 101 may be configured to compute the domain matching scores for the identified domain with the plurality of pre-stored domains associated with the at least one user 102. In an embodiment, the plurality of pre-stored domains may be identified based on previous voice inputs from the at least one user 102.

At block 609, the voice assistant device 101 may be configured to determine the probability of issuance of the subsequent voice input to the voice assistant device 101, based on the domain matching scores, the one or more contextual factors and the historic data associated with the at least one user 102.

Referring back to FIG. 6A, at block 604, when the probability is greater than a predefined threshold value, the voice assistant device 101 may be configured to estimate the extended wake-up duration of the voice assistant device. In an embodiment, when the probability is lesser than the predefined threshold value, the extended wake-up duration may be determined to be zero.

At block 605, the voice assistant device 101 may be configured to extend duration of the wake-up mode of the voice assistant device 101 for the extended wake-up duration to receive the subsequent voice input from the at least one user 102. When the probability is lesser than the predefined threshold value determining, the voice assistant device 101 may be configured to be in sleep-mode until a trigger to operate in the wake-up mode is detected.

Methods illustrated in FIGS. 6A and 6B may include one or more blocks for executing processes in at least one of the voice assistant device 101, the control apparatus 109 and the probability determination apparatus 110. The methods illustrated in FIGS. 6A and 6B may be described in the general context of computer executable instructions. Generally, computer executable instructions can include routines, programs, objects, components, data structures, procedures, modules, and functions, which perform particular functions or implement particular abstract data types.

The order in which the methods illustrated in FIGS. 6A and 6B are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 7:
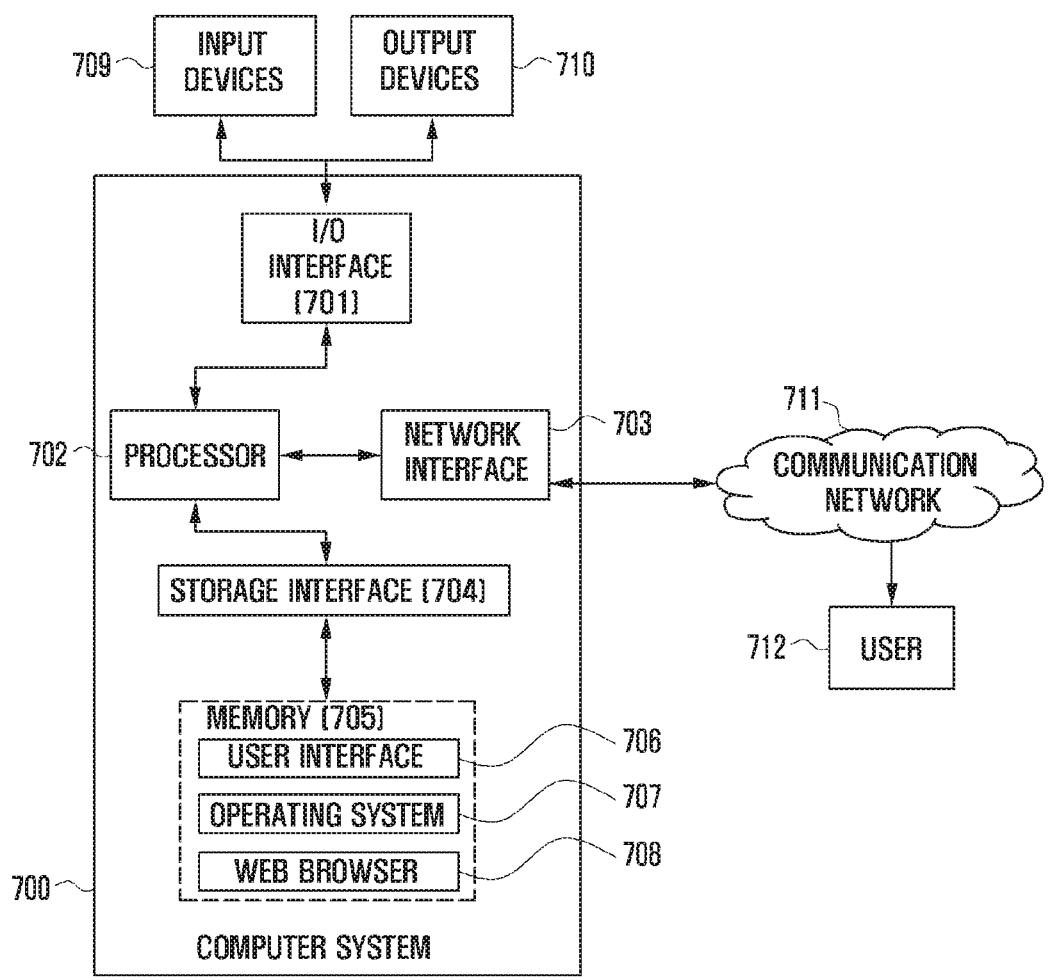
FIG. 7 illustrates a block diagram of a computer system for implementing embodiments consistent with the present disclosure.

FIG. 7 illustrates a block diagram of a computer system 700 for implementing embodiments consistent with the present disclosure. In an embodiment, the computer system 700 is used to implement at least one of the voice assistant device 101, the control apparatus 109 and the probability determination apparatus 110. The computer system 700 may include a central processing unit ("CPU" or "processor") 702. The processor 702 may include at least one data processor for executing processes in Virtual Storage Area Network. The processor 702 may include specialized processing units such as, integrated system (bus) controllers, memory management control units, floating point units, graphics processing units, digital signal processing units, etc.

The processor 702 may be disposed in communication with one or more input/output (I/O) devices 709 and 710 via I/O interface 701. The I/O interface 701 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices 709 and 710. For example, the input devices 709 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 710 may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

In some embodiments, the computer system 700 may consist of at least one of the voice assistant device 101, the control apparatus 109 and the probability determination apparatus 110. The processor 702 may be disposed in communication with the communication network 711 via a network interface 703. The network interface 703 may communicate with the communication network 711. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 711 may include, without limitation, a direct interconnection, local area network (LAN), wide area network (WAN), wireless network (e.g., using Wireless Application Protocol), the Internet, etc. Using the network interface 703 and the communication network 711, the computer system 700 may communicate with the user 712 for providing service to the user 712. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 711 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web browser 708 etc. In some embodiments, computer system 700 may store user/application data 706, such as, the data, variables, records, etc., as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 700 may implement a web browser 708 stored program component. The web browser 708 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 700 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure is configured to provide best user experience by dynamically determining extension duration of wake-up mode of voice assistance device.

An embodiment of the present disclosure provides accurate probability of issuance of subsequent voice inputs, by considering intent of voice inputs, historic data and contextual factors associated with user.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the disclosure, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIGS. 6A and 6B show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a voice assistant device, the method comprising:
   receiving, by the voice assistant device, at least one voice input from a user during wake-up mode of the voice assistance device;
   identifying, by the voice assistant device, intent associated with the at least one voice input from the user;
   determining, by the voice assistant device, a probability of issuance of a subsequent voice input from the user based on at least one of the intent, historic data and one or more contextual factors;
   comparing, by the voice assistant device, the probability with a threshold value; and
   extending, by the voice assistant device, a duration of the wake-up mode of the voice assistant device based on comparing the probability with the threshold value, for a extended wake-up duration to receive the subsequent voice input from the at least one user.

2. The method as claimed in claim 1, wherein the threshold value is determined by analysis of the historic data, through devices connected to the voice assistance device.

3. The method as claimed in claim 1, further comprising:
   determining, by a control apparatus, the probability to be lesser than the threshold value; and
   configuring, by the control apparatus, the voice assistant device to be in sleep-mode until a trigger to operate in the wake-up mode is detected.

4. The method as claimed in claim 1, further comprising configuring, by a control apparatus, the voice assistant device to be in sleep-mode if absence of the subsequent voice input is detected during the extended wake-up duration.

5. The method as claimed in claim 1, wherein the intent associated with the at least one voice input is identified by performing Natural-Language Understanding on the at least one voice input.

6. The method as claimed in claim 1, wherein the one or more contextual factors comprises at least one of user related factors, time related factors data and environment related factors.

7. The method as claimed in claim 1, wherein determining the probability of issuance of the subsequent voice input comprises:
   extract one or more keywords from plurality of words in the at least one voice input;
   identify a domain associated with the at least one voice input based on the one or more keywords;
   compute domain matching scores for the identified domain with plurality of pre-stored domains associated with the user; and
   determine probability of issuance of the subsequent voice input to the voice assistant device, based on the domain matching scores.

8. The method as claimed in claim 7, wherein extracting the one or more keywords comprises:
   assigning weightage to each of the plurality of words of the at least one voice input; and
   identifying the one or more keywords from the plurality of words, with weightage greater than a weightage value, to be the one or more keywords.

9. The method as claimed in claim 1, further comprising:
   build a conversation knowledge for the at least one voice input, based on one or more extracted keywords, wherein the conversation knowledge is used for identifying the intent of the subsequent voice input to the voice assistant device.

10. The method of claim 1, further comprising:
    determining, by the voice assistant device, the extended wake-up duration of the voice assistant device based on comparing the probability with the threshold value, when the probability is greater than the threshold value.

11. A voice assistant device, comprising:
    a receiver configured to receive at least one voice input from at least one user, when operated in a wake-up mode;
    a processor; and
    a memory communicatively coupled to the processor, wherein the memory stores processor-executable instructions that, when executed by the processor, cause the processor to:
      identify intent associated with the at least one voice input from the user;
      determine a probability of issuance of a subsequent voice input from the user based on at least one of the intent, historic data and one or more contextual factors;
      compare the probability with a threshold value;
      determine an extended wake-up duration of the voice assistant device based on comparing the probability with the threshold value, when the probability is greater than the threshold value; and
      extend a duration of the wake-up mode based on comparing the probability with the threshold value, for a extended wake-up duration to receive the subsequent voice input from the user.

12. The voice assistant device as claimed in claim 11, wherein the threshold value is determined by analysis of the historic data, through devices connected to the voice assistance device.

13. The voice assistant device as claimed in claim 11, further comprises the processor configured to:
   determine the probability to be lesser than the threshold value; and
   configure to be operated in sleep-mode until a trigger to be operated in the wake-up mode is detected.

14. The voice assistant device as claimed in claim 11, wherein the intent associated with the at least one voice input is determined by performing Natural-Language Understanding (NLU) on the at least one voice input.

15. The voice assistant device as claimed in claim 11, wherein the one or more contextual factors comprises at least one of user related factors, time related factors data and environment related factors.

16. The voice assistant device as claimed in claim 11, wherein the processor is configured to determine the probability of issuance of the subsequent voice input by performing the steps of:
   extract one or more keywords from plurality of words in the at least one voice input;
   identify a domain associated with the at least one voice input based on the one or more keywords;
   compute domain matching scores for the identified domain with plurality of pre-stored domains associated with the user; and
   determine the probability of issuance of the subsequent voice input to the voice assistant device, based on the domain matching scores.

17. The voice assistant device as claimed in claim 16, wherein extraction of the one or more keywords is performed by:
   assigning weightage to each of the plurality of words of the at least one voice input; and
   identifying one or more keywords from the plurality of words, with weightage greater than a weightage value, to be the one or more keywords.

18. The voice assistant device as claimed in claim 11, further comprises the processor configured to:
   build a conversation knowledge for the at least one voice input, based on one or more extracted keywords, wherein the conversation knowledge is used for identifying the intent of the subsequent voice input to the voice assistant device.

19. The voice assistant device as claimed in claim 11, further comprises the processor configured to:
   configure the voice assistant device to be in sleep-mode if absence of the subsequent voice input is detected during the extended wake-up duration.

20. The voice assistant device of claim 11, wherein the processor is further configured to:
   determine the extended wake-up duration of the voice assistant device based on comparing the probability with the threshold value, when the probability is greater than the threshold value.

* * * * *